(12) United States Patent
Furuta

(10) Patent No.: US 11,884,118 B2
(45) Date of Patent: Jan. 30, 2024

(54) DAMPING CONTROL APPARATUS AND METHOD FOR A VEHICLE

(71) Applicant: Toyota Jidosha Kabushiki Kaisha, Toyota (JP)

(72) Inventor: Hiroki Furuta, Numazu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 391 days.

(21) Appl. No.: 17/357,266

(22) Filed: Jun. 24, 2021

(65) Prior Publication Data

US 2021/0402841 A1 Dec. 30, 2021

(30) Foreign Application Priority Data

Jun. 29, 2020 (JP) .................................. 2020-111766

(51) Int. Cl.
*B60G 17/0165* (2006.01)

(52) U.S. Cl.
CPC .... *B60G 17/0165* (2013.01); *B60G 2400/102* (2013.01); *B60G 2400/252* (2013.01);
(Continued)

(58) Field of Classification Search
CPC .......... B60G 17/0165; B60G 2400/102; B60G 2400/252; B60G 2400/91; B60G 2600/602; B60G 2600/604
See application file for complete search history.

(56) References Cited

U.S. PATENT DOCUMENTS 4,749,210 A * 6/1988 Sugasawa .......... B60G 17/0165
280/124.102
11,370,414 B2 6/2022 Takei
(Continued)

FOREIGN PATENT DOCUMENTS

DE 102016216008 A1 3/2018
EP 3904134 A2 11/2021
(Continued)

OTHER PUBLICATIONS

Notice of Allowance dated Dec. 1, 2022 to U.S. Appl. No 17/337,771, filed Jun. 3, 2021.
(Continued)

*Primary Examiner* — Jacob M Amick
(74) *Attorney, Agent, or Firm* — Dinsmore & Shohl LLP

(57) ABSTRACT

A damping control apparatus has a control unit that controls an active actuator that generates a control force for damping a sprung, and the control unit determines a predicted wheel passage position where a wheel is predicted to pass, performs a high-pass filtering on a first road surface displacement-related value, performs a low-pass filtering on a second road surface displacement-related value, calculates a target control force for damping the sprung when the wheel passes through the predicted wheel passage position based on a sum of the first road surface displacement-related value after high-pass filtering and the second road surface displacement-related value after low-pass filtering, and the second road surface displacement-related value has a higher possibility that a position where a control force corresponding to the target control force is generated misaligns with the predicted wheel passage position as compared with the first road surface displacement-related value.

12 Claims, 23 Drawing Sheets

(52) U.S. Cl.
CPC ...... *B60G 2400/82* (2013.01); *B60G 2400/91* (2013.01); *B60G 2600/602* (2013.01); *B60G 2600/604* (2013.01)

(56) References Cited

U.S. PATENT DOCUMENTS

| | | | |
|---|---|---|---|
| 2003/0033063 A1 | 2/2003 | Kawashima et al. | |
| 2010/0324780 A1 | 12/2010 | Koumura et al. | |
| 2013/0103259 A1* | 4/2013 | Eng | B60G 17/0165 701/37 |
| 2015/0352920 A1 | 12/2015 | Lakehal-Ayat et al. | |
| 2018/0154723 A1* | 6/2018 | Anderson | H02K 11/33 |
| 2019/0168563 A1 | 6/2019 | Barecke et al. | |
| 2019/0255903 A1* | 8/2019 | Hirao | B60G 17/08 |
| 2020/0055363 A1* | 2/2020 | Paiva | B60G 17/0182 |
| 2020/0398630 A1 | 12/2020 | Sohn et al. | |
| 2021/0370738 A1 | 12/2021 | Furuta | |
| 2021/0379953 A1 | 12/2021 | Furuta | |
| 2021/0379955 A1 | 12/2021 | Furuta | |
| 2021/0387498 A1 | 12/2021 | Furuta | |
| 2021/0402840 A1 | 12/2021 | Furuta | |
| 2021/0402841 A1 | 12/2021 | Furuta | |

FOREIGN PATENT DOCUMENTS

| | | |
|---|---|---|
| JP | H05319066 A | 12/1993 |
| JP | 2009-096366 A | 5/2009 |
| JP | 2016-107778 A | 6/2016 |

OTHER PUBLICATIONS

Non-Final Office Action dated Aug. 18, 2022 to U.S. Appl. No. 17/337,771, filed Jun. 3, 2021.

\* cited by examiner

DAMPING CONTROL APPARATUS AND METHOD FOR A VEHICLE

CROSS-REFERENCE TO RELATED APPLICATION

This application claims priority to Japanese Patent Application No. JP2020-111766 filed on Jun. 29, 2020, the content of which is hereby incorporated by reference in its entirety into this application.

BACKGROUND

1. Technical Field

The present disclosure relates to a damping control apparatus and method for a vehicle such as an automobile.

2. Description of the Related Art

In a control of damping a sprung of a vehicle, a control force in the vertical direction generated between a wheel and a vehicle body is controlled in order to dampen the sprung. As a damping control on a sprung of a vehicle, for example, as described in Japanese Patent Application Laid-open No. H05-319066, there is known a preview damping control that damps a sprung at a front wheel position and a rear wheel position by using a vertical road surface displacement in front of a vehicle acquired by a preview sensor. According to the preview damping control, compared to a damping control that detects a vertical motion state quantity of a vehicle such as a vertical acceleration of a sprung and is performed based on the detection result, it is possible to effectively damp the sprung without delay.

Further, as described in U.S. Unexamined Patent Application Publication No. 2018/0154723, for example, as a control for damping a sprung of a vehicle, also known is preview damping control performed based on preview reference data (road surface information acquired in advance) including information on a vehicle position and road surface information. The preview reference data is stored in a server with which the vehicle can communicate wirelessly. The road surface information included in the preview reference data is a value representing a vertical displacement of a road surface (road surface displacement), and is generated based on sensing data acquired by a preview sensor such as a camera sensor, LIDAR, radar, a planar or three-dimensional scanning sensor.

In order to improve accuracy of road surface information included in a preview reference data, it is conceivable to acquire an unsprung displacement in the vertical direction based on a vertical motion state quantity of a vehicle detected when the vehicle is running, and to use a combination of the unsprung displacement and a position where the motion state quantity is detected as a preview reference data. According to the damping control using a preview reference data based on the motion state quantity, it is possible to damp the sprung with higher accuracy than the damping control using a preview reference data based on the sensing by a preview sensor.

In the preview damping control, an unsprung displacement-related value at a predicted wheel passage position where a wheel is predicted to pass is acquired, a target control force for damping the sprung is calculated based on the road surface displacement-related value, and a control force when the wheel passes the predicted wheel passage position is controlled to be the target control force.

In a damping control using a preview reference data, compared with a damping control in which an unsprung displacement-related value is acquired based on a detection result of an on-board sensor such as a preview sensor, a position where a control force corresponding to a target control force is generated and a predicted wheel passage position are more likely to deviate in a situation where an unsprung displacement-related value has a high time change rate.

Further, even in the damping control in which an unsprung displacement-related value is acquired based on a detection result of an on-board sensor, when the on-board sensor is a preview sensor, compared to where an on-board sensor is a sensor that detects a motion state quantity in the vertical direction of the vehicle, a position where a control force corresponding to a target control force is generated and a predicted wheel passage position are more likely to deviate. In this specification, a deviation between a position where a control force corresponding to a target control force is generated and a predicted wheel passage position is referred to as "a deviation between a position of the wheel and a predicted wheel passage position when the damping control is executed" or "misalignment of positions", if necessary.

SUMMARY

The present disclosure provides a damping control apparatus and method which are improved to damp a sprung more accurately than hi the past by calculating a target control force by taking advantage of a damping control that uses a preview reference data based on a motion state quantity and a damping control that acquires an unsprung displacement-related value based on a detection result of an on-board sensor.

According to the present disclosure, a damping control apparatus for a vehicle is provided which comprises a control force generating device configured to generate a vertical control force for damping a sprung of the vehicle between at least one wheel and a vehicle body portion corresponding to a position of the wheel; an electronic control unit configured to control the control force generating device; and a road surface displacement-related information acquisition device configured to acquire road surface displacement-related information related to a vertical displacement of a road surface.

The electronic control unit is configured to determine a predicted wheel passage position where a wheel is predicted to pass, perform a high-pass filter processing on a first road surface displacement-related value, perform a low-pass filter processing on a second road surface displacement-related value, calculate a target control force for reducing a vibration of the sprung when the wheel passes through the predicted wheel passage position based on a sum of the first road surface displacement-related value after the high-pass filter processing and the second road surface displacement-related value after the low-pass filter processing, and control the control force generating device so that a control force generated by the control force generating device when the wheel passes through the predicted wheel passage position becomes the target control force.

The first and second road surface displacement-related values are two different road surface displacement-related values among a road surface displacement-related value acquired based on road surface displacement-related information stored in a storage device that stores a road surface displacement-related information acquired based on a vertical motion state quantity of the vehicle or the other vehicles when the vehicle or the other vehicles travels in association with the information of a position where the motion state quantity is detected, a road surface displacement-related value calculated by a calculation unit that calculates a road surface displacement-related value based on a vertical motion state quantity of the vehicle, and a road surface displacement-related value acquired by a preview sensor that acquires a road surface displacement-related value in front of the vehicle.

The second road surface displacement-related value has a higher possibility that a position where a control force corresponding to the target control force is generated deviates from or misaligns with the predicted wheel passage position as compared with the first road surface displacement-related value.

According to the above configuration, the first road surface displacement-related value is high-pass filtered, and the second road surface displacement-related value is low-pass filtered. Further, a target control force for damping the sprung at the wheel position is calculated based on a sum of the first road surface displacement-related value after the high-pass filter processing and the second road surface displacement-related value after the low-pass filter processing. The second road surface displacement-related value has a higher possibility that a position where a control force corresponding to the target control force is generated misaligns with the predicted wheel passage position as compared with the first road surface displacement-related value.

As described above, the second road surface displacement-related value, which has a higher possibility that a position where a control force corresponding to the target control force is generated misaligns with the predicted wheel passage position as compared with the first road surface displacement-related value, is a low-pass filter processed. Therefore, while reducing an error of the damping control due to the misalignment of positions in a high frequency region, it is possible to calculate a highly accurate target control force mainly based on the second road surface displacement-related value in a low to medium frequency region.

Further, the first road surface displacement-related value is high-pass filtered. Therefore, in the high frequency region, a target control force can be calculated mainly based on the first road surface displacement-related value, so that it is possible to reduce the possibility that a target control force is insufficient as compared to where a target control force is calculated based only on the second road surface displacement-related value after the low-pass filter processing.

Therefore, since the high-pass filter processing and the low-pass filter processing function as complementary filter processing, it is possible to calculate a target control force with a small error due to a deviation between a position of the wheel and a predicted wheel passage position when the damping control is executed, which enables to damp the sprung more accurately than in the past. Notably, when a target damping control force is calculated using only an unsprung displacement-related value based on the unsprung displacement-related information acquired by an on-board sensor, it is not necessary to filter the unsprung displacement-related value online. Therefore, the controllability of the damping in an extremely low frequency region is not deteriorated due to filtering.

In one aspect of the present disclosure, the road surface displacement-related information acquisition device includes the preview sensor and the storage device, and the first road surface displacement-related value is a road surface displacement-related value acquired by the preview sensor, and the second road surface displacement-related value is a road surface displacement acquired based on the road surface displacement-related information stored in the storage device.

According to the above aspect, the first road surface displacement-related value is acquired by the preview sensor. The second road surface displacement-related value is acquired based on the road surface displacement-related information stored in the storage device, and is more likely to be misaligned in position than the first road surface displacement-related value. The first road surface displacement-related value is high-pass filtered, and the second road surface displacement-related value is low-pass filtered. Therefore, compared to where the second road surface displacement-related value is not low-pass filtered and the first road surface displacement-related value is not high-pass filtered, it is possible to reduce the possibility that an error in the damping control occurs due to misalignment of positions in a high frequency region.

In another aspect of the present disclosure, the road surface displacement-related information acquisition device includes a sprung vertical acceleration sensor that detects a vertical acceleration of the sprung at a position of the wheel and a stroke sensor that detects a relative displacement between the sprung and the unsprung at the position of the wheel, and a storage device, and the first road surface displacement-related value is a road surface displacement-related value calculated based on a vertical acceleration of the sprung and a relative displacement between the sprung and the unsprung, and the second road surface displacement-related value is a road surface displacement-related value acquired based on the road surface displacement-related information stored in the storage device.

According to the above aspect, the first road surface displacement-related value is calculated based on a vertical acceleration of the sprung detected by the sprung vertical acceleration sensor and a relative displacement between the sprung and the unsprung detected by the stroke sensor. The second road surface displacement-related value is acquired based on the road surface displacement-related information stored hi the storage device, and is more likely to be misaligned in position than the first road surface displacement-related value. The first road surface displacement-related value is high-pass filtered, and the second road surface displacement-related value is low-pass filtered. Therefore, compared to where the second road surface displacement-related value is not low-pass filtered and the first road surface displacement-related value is not high-pass filtered, it is possible to reduce the possibility that an error in the damping control occurs due to misalignment of positions in a high frequency region.

Further, in another aspect of the present disclosure, the road surface displacement-related information acquisition device includes an unsprung vertical acceleration sensor that detects a vertical acceleration of an unsprung at a position of the wheel, and the storage device, and the first road surface displacement-related value is a road surface displacement-related value calculated based on a vertical acceleration of the unsprung, and the second road surface displacement-related value is a road surface displacement-related value acquired based on the road surface displacement-related information stored in the storage device.

According to the above aspect, the first road surface displacement-related value is calculated based on a vertical acceleration of the unsprung detected by the unsprung vertical acceleration sensor. The second road surface displacement-related value is acquired based on the road surface displacement-related information stored in the storage device, and is more likely to be misaligned in position than the first road surface displacement-related value. The first road surface displacement-related value is high-pass filtered, and the second road surface displacement-related value is low-pass filtered. Therefore, compared to where the second road surface displacement-related value is not low-pass filtered and the first road surface displacement-related value is not high-pass filtered, it is possible to reduce the possibility that an error in the damping control occurs due to misalignment of positions in a high frequency region.

Further, in another aspect of the present disclosure, the road surface displacement-related information acquisition device includes at least one of a sprung vertical acceleration sensor that detects a vertical acceleration of the sprung at a position of the wheel, and a stroke sensor that detects a relative displacement between the sprung and an unsprung at the position of the wheel, an unsprung vertical acceleration sensor that detects a vertical acceleration of an usprung at the position of the wheel, and the storage device, and the first road surface displacement-related value is a road surface displacement-related value acquired by using an observer based on a motion state quantity detected by at least one of the sensors, and the second road surface displacement-related value is a road surface displacement-related value acquired based on the road surface displacement-related information stored in the storage device.

According to the above aspect, the first road surface displacement-related value is acquired by using an observer based on a sprung vertical acceleration detected by the sprung vertical acceleration sensor. The second road surface displacement-related value is acquired based on the road surface displacement-related information stored in the storage device, and is more likely to be misaligned in position than the first road surface displacement-related value. The first road surface displacement-related value is high-pass filtered, and the second road surface displacement-related value is low-pass filtered. Therefore, compared to where the second road surface displacement-related value is not low-pass filtered and the first road surface displacement-related value is not high-pass filtered, it is possible to reduce the possibility that an error in the damping control occurs due to misalignment of positions in a high frequency region.

Further, in another aspect of the present disclosure, the road surface displacement-related information acquisition device includes a sprung vertical acceleration sensor that detects a vertical acceleration of the sprung at a position of the wheel and a stroke sensor that detects a relative displacement between the sprung and an unsprung at the position of the wheel, and the preview sensor, and the first road surface displacement-related value is a road surface displacement-related value calculated based on a vertical acceleration of the sprung and a relative displacement between the sprung and the unsprung, and the second road surface displacement-related value is a road surface displacement-related value acquired by the preview sensor.

According to the above aspect, the first road surface displacement-related value is calculated based on a vertical acceleration of the sprung detected by the sprung vertical acceleration sensor and a relative displacement between the sprung and the unsprung detected by the stroke sensor. The second road surface displacement-related value is acquired by the preview sensor, and is more likely to be misaligned in position than the first road surface displacement-related value. The first road surface displacement-related value is high-pass filtered, and the second road surface displacement-related value is low-pass filtered. Therefore, compared to where the second road surface displacement-related value is not low-pass filtered and the first road surface displacement-related value is not high-pass filtered, it is possible to reduce the possibility that an error in the damping control occurs due to misalignment of positions in a high frequency region.

Further, in another aspect of the present disclosure, the road surface displacement-related information acquisition device includes an unsprung vertical acceleration sensor that detects a vertical acceleration of an unsprung at a position of the wheel, and the preview sensor, and the first road surface displacement-related value is a road surface displacement-related value calculated based on a vertical acceleration of the unsprung, and the second road surface displacement-related value is a road surface displacement-related value acquired by the preview sensor.

According to the above aspect, the first road surface displacement-related value is calculated based on a vertical acceleration of the unsprung detected by the unsprung vertical acceleration sensor. The second road surface displacement-related value is acquired by the preview sensor, and is more likely to be misaligned in position than the first road surface displacement-related value. The first road surface displacement-related value is high-pass filtered, and the second road surface displacement-related value is low-pass filtered. Therefore, compared to where the second road surface displacement-related value is not low-pass filtered and the first road surface displacement-related value is not high-pass filtered, it is possible to reduce the possibility that an error in the damping control occurs due to misalignment of positions in a high frequency region.

Further, in another aspect of the present disclosure, the road surface displacement-related information acquisition device includes at least one of a sprung vertical acceleration sensor that detects a vertical acceleration of the sprung at a position of the wheel, and a stroke sensor that detects a relative displacement between the sprung and an unsprung at the position of the wheel, and an unsprung vertical acceleration sensor that detects an unsprung vertical acceleration at the position of the wheel, and the preview sensor, and the first road surface displacement-related value is a road surface displacement-related value acquired by using an observer based on a motion state quantity detected by at least one of the sensors, and the second road surface displacement-related value is a road surface displacement-related value acquired by the preview sensor.

According to the above aspect, the first road surface displacement-related value is acquired by using an observer based on a vertical acceleration of the unsprung detected by the unsprung vertical acceleration sensor. The second road surface displacement-related value is acquired by the preview sensor, and is more likely to be misaligned in position than the first road surface displacement-related value. The first road surface displacement-related value is high-pass filtered, and the second road surface displacement-related value is low-pass filtered. Therefore, compared to where the second road surface displacement-related value is not low-pass filtered and the first road surface displacement-related value is not high-pass filtered, it is possible to reduce the possibility that an error in the damping control occurs due to misalignment of positions in a high frequency region.

Further, in another aspect of the present disclosure, the storage device is a storage device outside the vehicle, and the electronic control unit is configured to acquire road surface displacement-related information at the predicted wheel passage position from the storage device via a wireless communication line.

According to the above aspect, since the storage device is a storage device outside the vehicle, it is possible to eliminate the need to mount a high-capacity storage device on the vehicle.

Further, in another aspect of the present disclosure, a cutoff frequency of the high-pass filter processing and a cutoff frequency of the low-pass filter processing are the same.

According to the above aspect, since the high-pass filter processing and the low-pass filter processing can function as effective complementary filter processing, a target control force can be calculated by effectively reducing an error caused by the misalignment of positions and an error caused by a detection error.

Further, in another aspect of the present disclosure, the cutoff frequency is a frequency between a resonance frequency of the sprung and a resonance frequency of an unsprung corresponding to the wheel.

According to the above aspect, it is possible to effectively reduce an error caused by the misalignment of positions and an error caused by a detection error as compared to where the cutoff frequency is not between a resonance frequency of the sprung and a resonance frequency of an unsprung corresponding to the wheel.

Further, the present disclosure provides a damping control method for a vehicle which damps a sprung of the vehicle by controlling a control force generating device configured to generate a vertical control force for damping the sprung of the vehicle between at least one wheel and a vehicle body portion corresponding to a position of the wheel, wherein the method comprises: a step of determining a predicted wheel passage position where the wheel is predicted to pass, a step of acquiring a first road surface displacement-related value at the predicted wheel passage position and performing a high-pass filter processing on the first road surface displacement-related value, a step of acquiring a second road surface displacement-related value at the predicted wheel passage position and performing a low-pass filter processing on the second road surface displacement-related value, a step of calculating a target control force for reducing a vibration of the sprung when the wheel passes through the predicted wheel passage position based on a sum of the first road surface displacement-related value after high-pass filter processing and the second road surface displacement-related value after low-pass filter processing, and a step of controlling the control force generating device so that a control force generated by the control force generating device when the wheel passes through the predicted wheel passage position becomes the target control force, the first and second road surface displacement-related values are two different road surface displacement-related values among a road surface displacement-related value acquired based on road surface displacement-related information stored in a storage device that stores road surface displacement-related information acquired based on a vertical motion state quantity of the vehicle or the other vehicles when the vehicle or the other vehicles travels in association with the information of a position where the motion state quantity is detected, a road surface displacement-related value calculated by a calculation unit based on a vertical motion state quantity of the vehicle, and a road surface displacement-related value acquired by a preview sensor that acquires a road surface displacement-related value in front of the vehicle, and the second road surface displacement-related value has a higher possibility that a position where a control force corresponding to the target control force is generated misaligns with the predicted wheel passage position as compared with the first road surface displacement-related value.

According to the above method, since the second road surface displacement-related value is low-pass filtered, it is possible to calculate a target control force with high accuracy mainly based on the second road surface displacement-related value in the low to medium frequency region while reducing an error of damping control due to the misalignment in position in the high frequency region. Further, since the first road surface displacement-related value is high-pass filtered, a target control force can be calculated mainly based on the first road surface displacement-related value in the high frequency region, and as compared to where a target control force is calculated based only on the second road surface displacement-related value after the low-pass filter processing, the possibility that a target control force is insufficient can be reduced.

Therefore, according to the above method, since the high-pass filter processing and the low-pass filter processing can function as complementary filter processing, a target control force can be calculated reducing an error caused by a deviation between a position of the wheel damping control and a predicted wheel passage position when the damping control is executed and the sprung can be damped more accurately than in the past.

In the present application, "road surface displacement-related information" may be at least one of an unsprung displacement representing a vertical displacement of an unsprung of the vehicle, an unsprung velocity which is a time derivative value of the unsprung displacement, a road surface displacement representing a vertical displacement of a road surface and a road surface displacement velocity which is a time derivative value of the road surface displacement. Further, "road surface displacement-related value" may be one of an unsprung displacement representing a vertical displacement of the unsprung of the vehicle and a road surface displacement representing a vertical displacement of the road surface.

Other objects, other features and attendant advantages of the present disclosure will be readily understood from the description of the embodiments of the present disclosure described with reference to the following drawings.

DETAILED DESCRIPTION

First Embodiment

<Configuration>

Figure 1:
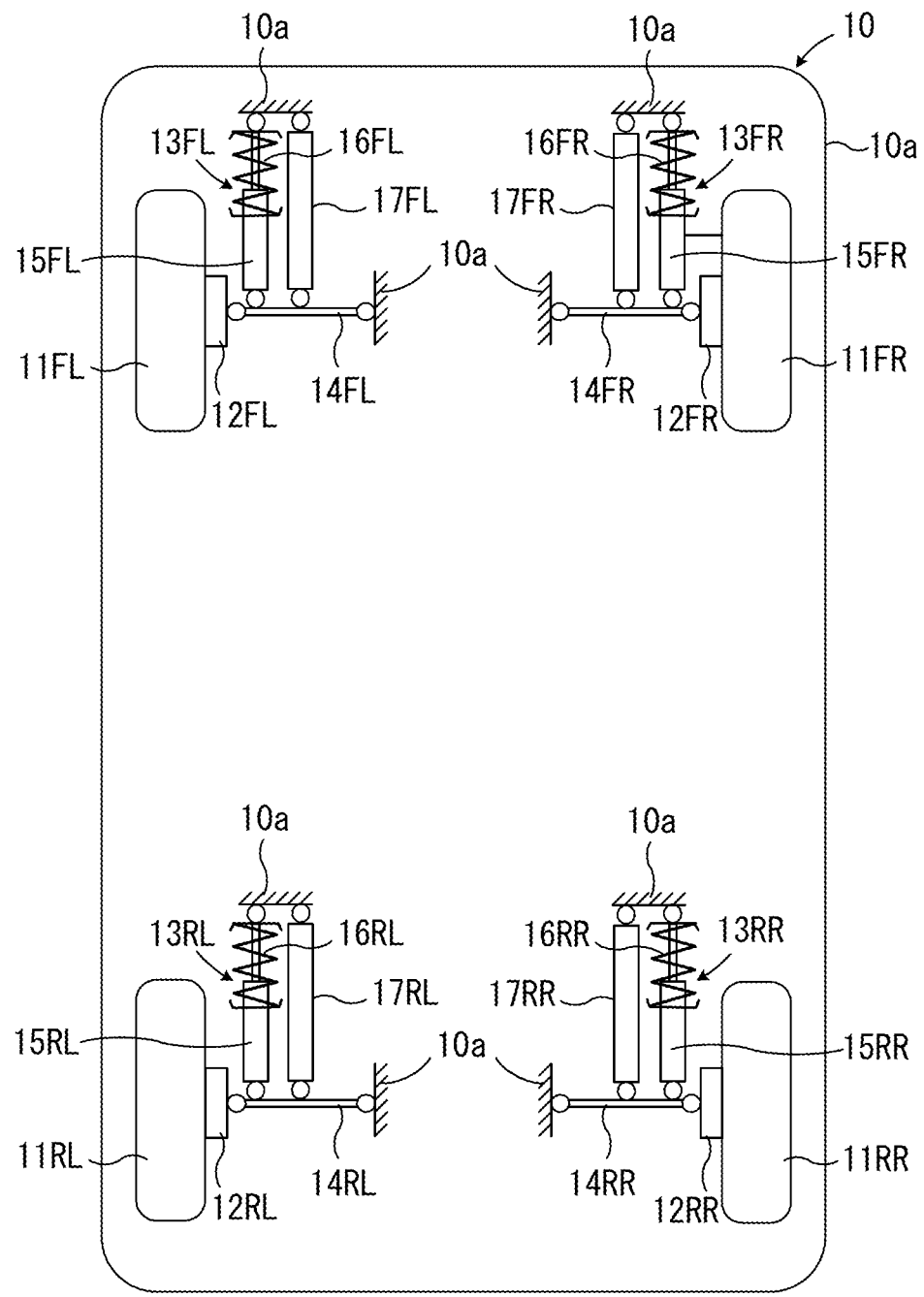
FIG. 1 is a schematic configuration diagram of a vehicle to which the damping control apparatus according to embodiments of the present disclosure is applied.

A damping control apparatus for a vehicle according to the first embodiment of the present disclosure is schematically illustrated by reference numeral 20 as a whole in FIG. 2. Hereinafter, the damping control apparatus 20 for a vehicle is sometimes simply referred to as a "damping control apparatus 20". The damping control apparatus 20 is applied to a vehicle 10 shown in FIG. 1.

The vehicle 10 comprises a front left wheel 11FL, a front right wheel 11FR, a rear left wheel 11RL, and a rear right wheel 11RR. The front left wheel 11FL is rotatably supported by a wheel supporting member 12FL. The front right wheel 11FR is rotatably supported by a wheel supporting member 12FR. The rear left wheel 11RL is rotatably supported by a wheel supporting member 12RL. The rear right wheel 11RR is rotatably supported by a wheel supporting member 12RR.

The front left wheel 11FL, the front right wheel 11FR, the rear left wheel 11RL, and the rear right wheel 11RR are sometimes referred to as "the wheels 11FL-11RR". When the front left wheel 11FL, the front right wheel 11FR, the rear left wheel 11RL, and the rear right wheel 11RR need not be distinguished from each other, each of them is sometimes referred to as a "wheel 11". When the front left wheel 11FL and the front right wheel 11FR need not be distinguished from each other, each of them is sometimes referred to as a "front wheel 11F". When the rear left wheel 11RL and the rear right wheel 11RR need not be distinguished from each other, each of them is sometimes referred to as a "rear wheel 11R". When the wheel supporting members 12FL-12RR need not be distinguished from each other, each of them is sometimes referred to as a "wheel supporting member 12".

The vehicle 10 further comprises a front left suspension 13FL, a front right suspension 13FR, a rear left suspension 13RL, and a rear right suspension 13RR. Details of these suspensions 13FL to 13RR will be described below. In one example, these suspensions 13FL to 13RR are independent suspension type suspensions.

The front left suspension 13FL includes a suspension arm 14FL, a shock absorber 15FL, and a suspension spring 16FL, to suspend the front left wheel 11FL from a vehicle body 10a. The front right suspension 13FR includes a suspension arm 14FR, a shock absorber 15FR, and a suspension spring 16FR, to suspend the front right wheel 11FR from the vehicle body 10a.

The rear left suspension 13RL includes a suspension arm 14RL, a shock absorber 15RL, and a suspension spring 16RL, to suspend the rear left wheel 11RL from the vehicle body 10a. The rear right suspension 13RR includes a suspension arm 14RR, a shock absorber 15RR, and a suspension spring 16RR, to suspend the rear right wheel 11RR from the vehicle body 10a.

The front left suspension 13FL, the front right suspension 13FR, the rear left suspension 13RL, and the rear right suspension 13RR are sometimes referred to as "the suspensions 13FL-13RR". When the front left suspension 13FL, the front right suspension 13FR, the rear left suspension 13RL, and the rear right suspension 13RR need not be distinguished from each other, each of them is sometimes referred to as a "suspension 13". When the suspension arms 14FL-14RR need not be distinguished from each other, each of them is sometimes referred to as a "suspension arm 14". When the shock absorbers 15FL-15RR need not be distinguished from each other, each of them is sometimes referred to as a "shock absorber 15". When the suspension springs 16FL-16RR need not be distinguished from each other, each of them is sometimes referred to as a "suspension spring 16".

The suspension arm 14 connects the wheel supporting member 12 to the vehicle body 10a. It should be noted that, although only one suspension arm 14 is illustrated per one suspension 13 in FIG. 1, a plurality of the suspension arms 14 may be provided per one suspension 13.

The shock absorber 15 is disposed between the vehicle body 10a and the suspension arm 14. An upper end of the shock absorber 15 is connected to the vehicle body 10a. A lower end of the shock absorber 15 is connected to the suspension arm 14. The suspension spring 16 is elastically disposed between the vehicle body 10a and the suspension arm 14 through the shock absorber 15. Namely, an upper end of the suspension spring 16 is connected to the vehicle body 10a. A lower end of the suspension spring 16 is connected to a cylinder of the shock absorber 15. It should be noted that the shock absorber 15 may be disposed between the vehicle body 10a and the wheel supporting member 12 in a case where the suspension spring 16 is elastically disposed in a manner as described.

The shock absorber 15 in this embodiment is an invariable damping force shock absorber, however, the shock absorber 15 may be a variable damping force shock absorber. Furthermore, the suspension spring 16 may be elastically disposed between the vehicle body 10a and the suspension arm 14 without utilizing the shock absorber 15. Namely, the upper end of the suspension spring 16 may be connected to the vehicle body 10a and the lower end of the suspension spring 16 may be connected to the suspension arm 14. When the suspension spring 16 is elastically disposed in this manner, the shock absorber 15 and the suspension spring 16 may be disposed between the vehicle body 10a and the wheel supporting member 12.

Among the members such as the wheel 11 and the shock absorber 15 of the vehicle 10, a portion on the wheel 11 side of the suspension spring 16 is referred to as an "unsprung 50 (see FIG. 3)". On the other hand, among the members such as the vehicle body 10a and the shock absorber 15 of the vehicle 10, a portion on the vehicle body 10a side of the suspension spring 16 is referred to as a "sprung 51 (see FIG. 3)".

A front left wheel active actuator 17FL, a front right wheel active actuator 17FR, a rear left wheel active actuator 17RL, and a rear right wheel active actuator 17RR are provided between the vehicle body 10a and the respective suspension arms 14. These active actuators 17FL to 17RR are provided in parallel with respect to the shock absorbers 15FL to 15RR and the suspension springs 16FL to 16RR, respectively.

When the front left wheel active actuator 17FL, the front right wheel active actuator 17FR, the rear left wheel active actuator 17RL, and the rear right wheel active actuator 17RR need not be distinguished from each other, each of them is referred to as an "active actuator 17". When the front left wheel active actuator 17FL and the front right wheel active actuator 17FR need not be distinguished from each other, each of them is referred to as a "front wheel active actuator 17F". When the rear left wheel active actuator 17RL and the rear right wheel active actuator 17RR need not be distinguished from each other, each of them is referred to as a "rear wheel active actuator 17R".

The active actuator 17 functions as an actuator that variably generates a vertical force (hereinafter referred to as a "control force") Fc that acts between the vehicle body 10a and the associated wheel 11 (between the sprung 51 and the unsprung 50) to damp the sprung 51 based on a control command from the electronic control unit (hereinafter, referred to as "ECU" and sometimes referred to as "control unit") 30 shown in FIG. 2. The active actuator 17 is sometimes referred to as a "control force generator". In this embodiment, the active actuator 17 is an electromagnetic active actuator. The active actuator 17 cooperates with the shock absorber 15, the suspension spring 16, and the like to form an active suspension.

Figure 2:
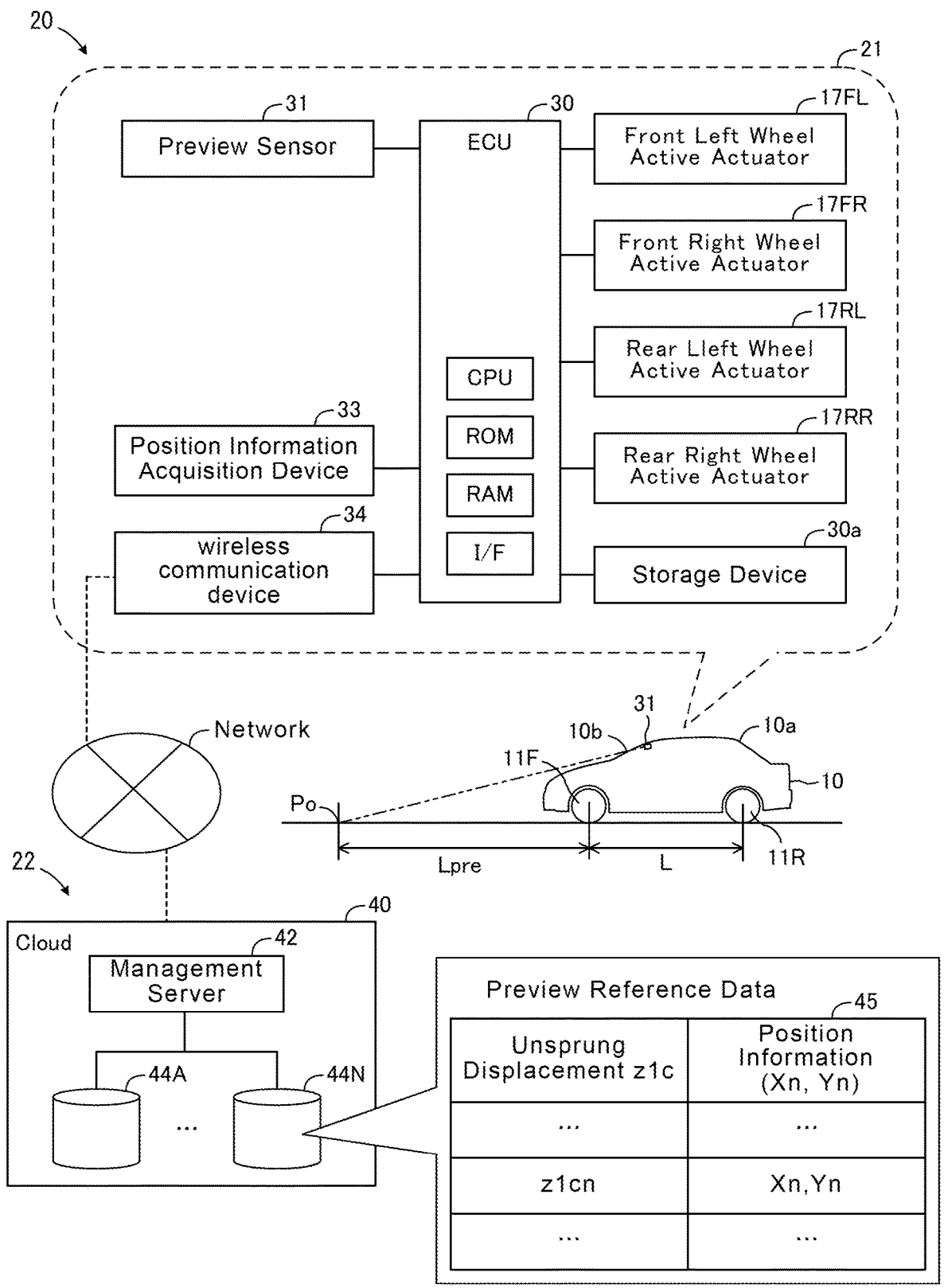
FIG. 2 is a schematic configuration diagram of a damping control apparatus according to the first embodiment of the present disclosure.

In the first embodiment, the damping control apparatus 20 includes an on-board device 21 and an external device 22 as shown in FIG. 2. The on-board device 21 includes an ECU 30, a storage device 30a, a position information acquisition device 33, and a wireless communication device 34. Further, the on-board device 21 includes the above-mentioned active actuators 17FL to 17RR.

The ECU 30 is an electronic control unit that includes a microcomputer. The microcomputer includes a CPU, a ROM, a RAM, and an interface (I/F). The CPU is configured or programmed to realize various functions by executing instructions (or programs, or routines) stored in the ROM.

The ECU 30 is connected with the storage device 30a that is a non-volatile, readable and writable storing device. In the present embodiment, the storage device 30a is a hard disc drive. The ECU 30 is configured to be able to write/store information in the storage device 30a, and read the information stored in the storage device 30a. The storage device 30a is not limited to the hard disc drive, but may be a well-known non-volatile, readable and writable memory device or memory medium.

The ECU 30 is connected to the preview sensor 31 and receives a signal output by the preview sensor. The preview sensor 31 may be any known preview sensor known in the art, such as a camera sensor, LIDAR, and radar, as long as it can acquire a value (referred to as "road surface displacement") representing a vertical displacement of a road surface in front of the vehicle 10. The ECU 30 functions as a road surface displacement-related information acquisition device that cooperates with the preview sensor 31, which is an on-board sensor, to acquire road surface displacement-related information in front of the vehicle and therefore in front of the wheels based on the detection result of the preview sensor.

As shown in FIG. 2, the preview sensor 31 is attached to, for example, an inner surface of an upper end portion of a windshield 10b of the vehicle 10 at the center in the vehicle width direction, and detects a road surface displacement z0 at a target position Po in front of the front wheel 11F by a preview distance Lpre and around it. In one example, the preview distance Lpre is larger than a front wheel foresee distance Lpf (described later) when a vehicle speed of the vehicle 10 is a rated maximum vehicle speed. Further, although only one preview sensor 31 is shown in FIG. 2, a pair of preview sensors corresponding to the left and right front wheels may be provided.

Further, the ECU 30 is connected to the position information acquisition device 33 and the wireless communication device 34.

The position information acquisition device 33 includes a GNSS (Global Navigation Satellite System) receiver and a map database. The GNSS receiver receives a signal from an artificial satellite (for example, a GNSS signal) for detecting a present time position (present position) of the vehicle 10. Road map information and the like are stored in the map database. The position information acquisition device 33 is a device that acquires the present position (for example, latitude and longitude) of the vehicle 10 based on the GNSS signal, and is, for example, a navigation device.

The ECU 30 acquires a vehicle speed V1 of the vehicle 10 and a traveling direction Td of the vehicle 10 at the present time based on the history of the present position acquired by the position information acquisition device 33.

The wireless communication device 34 is a wireless communication terminal for communicating information with a cloud 40 of the external device 22 via a network. The cloud 40 includes a management server 42 and a plurality of storage devices 44A to 44N and they are connected to the network. One or more storage devices 44A to 44N are referred to as a "storage device 44" when it is not necessary to distinguish them. The storage device 44 functions as a storage device outside the vehicle of the damping control apparatus 20.

The management server 42 includes a CPU, ROM, RAM, an interface (I/F), and the like. The management server 42 searches and reads a data stored in the storage device 44, and writes a data in the storage device 44.

A preview reference data 45 is stored in the storage device 44. In the preview reference data 45, an unsprung displacement z1 acquired based on vertical motion state quantities of the vehicle 10 or other vehicles detected when the vehicle or the other vehicles actually travels on a road surface is registered in association with an information on the position of a wheel where the vertical motion state quantities are detected. Therefore, the preview reference data 45 is data that is a combination of the unsprung displacement z1 acquired based on vertical motion state quantities of the vehicle or the other vehicles and an information of the position of the wheel where the vertical motion state quantities are detected.

The unsprung 50 is displaced in the vertical direction in response to a displacement of a road surface when the vehicle 10 travels on the road surface. The unsprung displacement z1 is the vertical displacement of the unsprung 50 corresponding to the position of each wheel 11 of the vehicle 10. The position information is information representing a position (for example, latitude and longitude) of the wheel 11 from which the unsprung displacement z1 was acquired at the time when the unsprung displacement z1 was acquired. In FIG. 2, as an example of the unsprung displacement z1c and the position information registered in association with the preview reference data 45, the unsprung displacement z1cn and the position information (Xn, Yn) (n=1, 2, 3, . . . ) are illustrated.

Further, the ECU 30 is connected to the left front wheel active actuator 17FL, the right front wheel active actuator 17FR, the left rear wheel active actuator 17RL, and the right rear wheel active actuator 17RR via drive circuits (not shown).

The ECU 30 calculates a target control force Fct for damping the sprung 51 of each wheel 11 based on the unsprung displacement z1 of a predicted passage position described later of each wheel 11, and controls the active actuator 17 so that a control force Fc generated by the active actuator 17 when each wheel 11 passes through the predicted passage position becomes the target control force Fct.

<Outline of Preview Damping Control>

Figure 3:
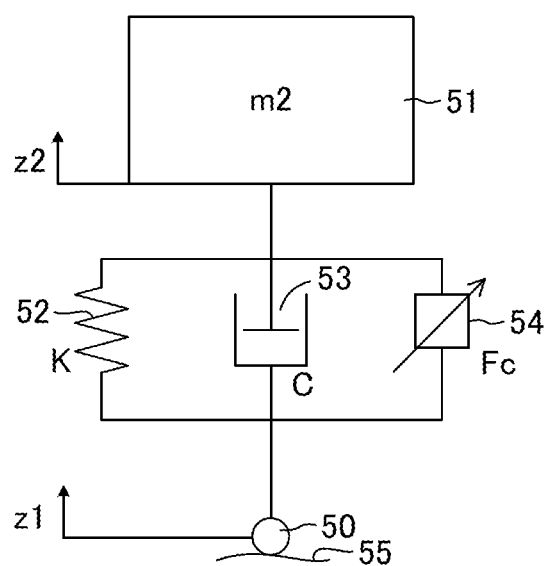
FIG. 3 is a diagram showing a single-wheel model of a vehicle.

An outline of the basic preview damping control performed by the damping control apparatus 20 will next be described. FIG. 3 illustrates a single wheel model of the vehicle 10.

A spring 52 corresponds to the suspension spring 16. A damper 53 corresponds to the shock absorber 15. An actuator 54 corresponds to the active actuator 17.

In FIG. 3, a mass of the sprung 51 is represented as a sprung mass m2. A vertical displacement of the unsprung 50 described above is represented as an unsprung displacement z1. Further, a vertical displacement of the sprung 51 is expressed as a sprung displacement z2, and the sprung displacement z2 is a vertical displacement of the sprung 51 corresponding to the position of each wheel 11. A spring constant (equivalent spring constant) of the spring 52 is expressed as a spring constant K. A damping coefficient (equivalent damping coefficient) of the damper 53 is expressed as a damping coefficient C. A force generated by the actuator 54 is referred to as a control force Fc.

Time derivative values of z1 and z2 are represented as dz1 and dz2, respectively. Second order time derivative values of z1 and z2 are represented as ddz1 and ddz2, respectively. The values of z1 and z2 become positive when the respective parts move upward. The forces generated by the spring 52, the damper 53, and the actuator 54 have positive signs when direction of the forces generated by them is upward.

In the single wheel model shown in FIG. 3, a motion equation regarding a vertical direction movement of the sprung mass 51 is expressed as the following equation (1).

$$m2 \cdot ddz2 = C \cdot (dz1-dz2) + K \cdot (z1-z2) - Fc \tag{1}$$

It is assumed that the damping coefficient C in the equation (1) is constant. However, since an actual damping coefficient changes according to a stroke speed of the suspension 13, for example, it may be variably set according to the time derivative value of the stroke H.

When the vibration is completely cancelled (eliminated) by the control force Fc (in other words, when the acceleration ddz2, the rate dz2, and the displacement z2, of the sprung mass 51 are made to be zero), the control force Fc is expressed as the following equation (2).

$$Fc = C \cdot dz1 + K \cdot z1 \tag{2}$$

Therefore, the control force Fc that reduces the vibration of the sprung 51 can be expressed by the following equation (3) with a control gain as α. The control gain α is an arbitrary constant greater than 0 and less than or equal to 1.

$$Fc = \alpha \cdot (C \cdot dz1 + K \cdot z1) \tag{3}$$

By applying the equation (3) to the equation (1), the equation (1) can be expressed as the following equation (4).

$$m2 \cdot ddz2 = C \cdot (dz1-dz2) + K \cdot (z1-z2) - \alpha \cdot (C \cdot dz1 + K \cdot z1) \tag{4}$$

When a Laplace transform is performed for the equation (4), and then the result is deformed, the equation (4) can be expressed as the following equation (5). In the equation (5), "s" represents a Laplace operator.

$$\frac{z_2}{z_1} = \frac{(1-\alpha)(Cs+K)}{m_2 s^2 + Cs + K} \tag{5}$$

As understood from the equation (5), a magnitude of the transfer function varies depending on a, and becomes minimum when a is equal to 1. Therefore, the target control force Fct can be expressed by the following equation (6) corresponding to the equation (3). A gain β1 in the equation (6) corresponds to αCs, and a gain β2 corresponds to αK.

$$Fct = \beta 1 \cdot dz1 + \beta 2 \cdot z1 \tag{6}$$

Therefore, the ECU 30 acquires in advance (previews) an unsprung displacement z1 at a position where the wheel 11 passes through later (predicted passage position), and applies the acquired unsprung displacement z1 to the equation (6) to calculate a target control force Fct. Then, the ECU 30 make the actuator 54 generate a control force Fc corresponding to the target control force Fct at a timing when the wheel 11 passes through the predicted passage position (that is, at a timing when the unsprung displacement z1 applied to the equation (6) occurs). In this way, it is possible to reduce a vibration of the sprung 51 that occurs when the wheel 11 passes through the predicted passage position (that is, when the unsprung displacement z1 applied to the equation (6) occurs).

The above is the damping control of the sprung 51, and such damping control of the sprung 51 is called the preview damping control.

It should be noted that, in the above single wheel model, a mass of the unsprung 50 and an elastic deformation of a tire are ignored so that a road surface vertical displacement z0 is deemed to be substantially the same as the unsprung displacement z1. Therefore, the preview damping control can be carried out using a vertical displacement z0 of a road surface in place of the unsprung displacement z1.

(Preview Damping Control of Front and Rear Wheels)

Next, with reference to FIGS. 4 to 6, the preview damping control of the front wheels and the rear wheels common to the embodiments will be described.

Figure 4:
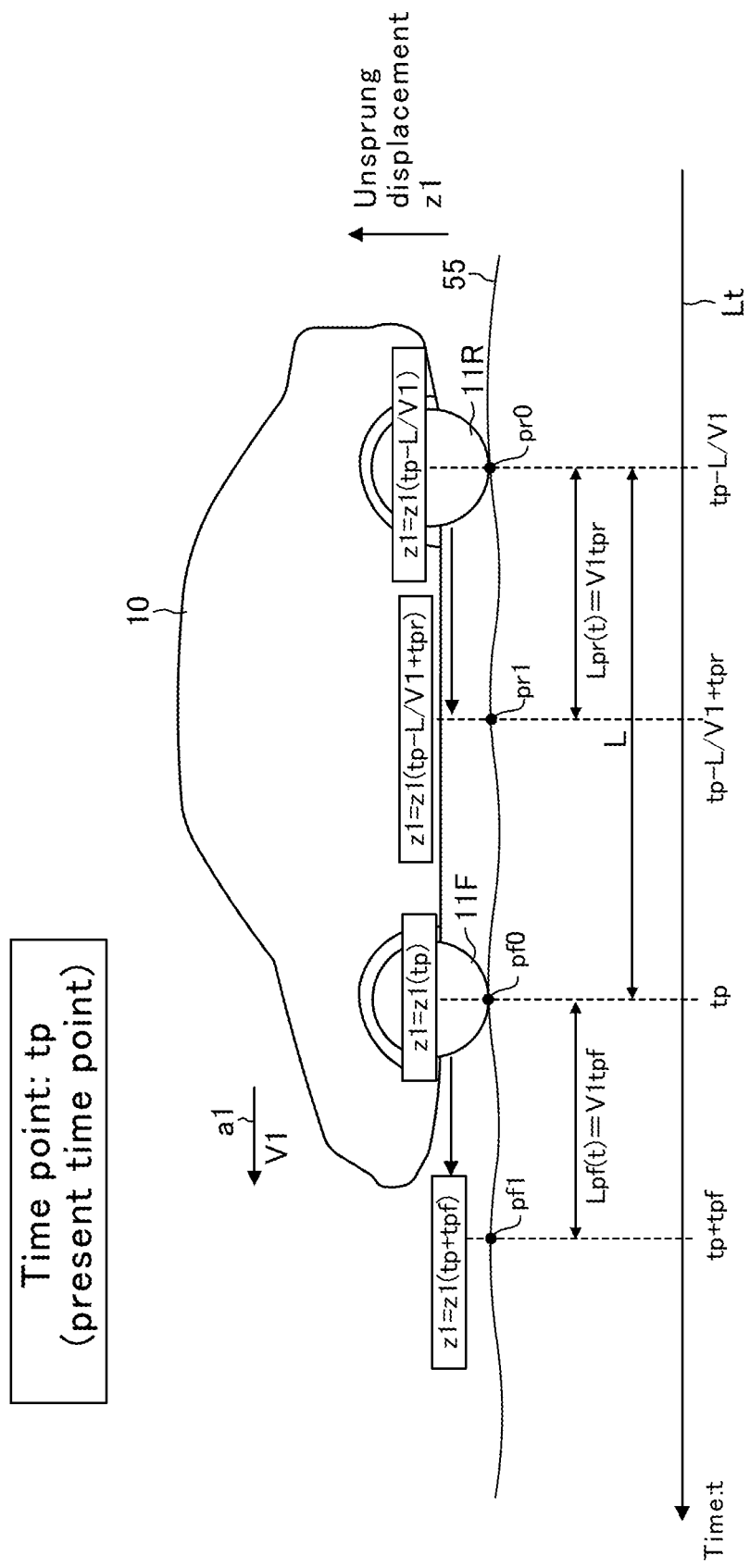
FIG. 4 is a diagram for explaining preview damping control.

FIG. 4 shows the vehicle 10 traveling at a vehicle speed V1 in a direction indicated by the arrow a1 at the present time tp. In the following description, the front wheel 11F and the rear wheel 11R are considered to be wheels on the same side, and moving speeds of the front wheel 11F and the rear wheel 11R are considered to be the same as the vehicle speed V1.

In FIG. 4, a line Lt is a virtual time axis. The unsprung displacement z1 of the front wheel 11F on a movement route of the front wheel 11F is expressed as a function z1(t), wherein t is a time. The time t can represent a present time point, a time point in the past, and a time point in the future. Accordingly, the unsprung displacement z1 of the front wheel 11F at a position (tire-ground contact point) pf0 at the present time point tp is expressed as z1(tp). Further, the unsprung displacement z1 of the position pr0 of the rear wheel 11R at the present time tp is the unsprung displacement z1 of the front wheel 11F at the time "tp−L/V1" that is before the present time tp by a time (L/V1) required for the front wheel 11F to move a wheelbase length L. Therefore, the unsprung displacement z1 of the rear wheel 11R at the present time tp is expressed as z1 (tp−L/V1).

<Preview Damping Control of the Front Wheel 11F>

The ECU 30 specifies (predicts) a predicted passage position pf1 of the front wheel 11F at a time point (in the future) a front wheel foresee time tpf from the present time tp. The front wheel foresee time tpf is set in advance as a time required for the front wheel active actuator 17F to output a control force Fcf corresponding to a target control force Fcft after the ECU 30 specifies the predicted passage position pf1.

The predicted passage position pf1 of the front wheel 11F is a position spaced from the position pf0 at the present time tp by a front wheel foresee distance Lpf (=V1×tpf) along a predicted front wheel movement course, which is a course where the front wheel 11F is predicted to move in the future. As will be described in detail later, the position pf0 is calculated based on a present position of the vehicle 10 acquired by the position information acquisition device 33.

When the predicted passage position pf1 of front wheel is specified, the ECU 30 acquires the unsprung displacement of the predicted passage position pf1 as the unsprung displacement z1(tp+tpf). Further, the ECU 30 calculates a time derivative value dz1(tp+tpf) of the unsprung displacement z1(tp+tpf). Since the acquisition of the unsprung displacement of the front wheel and the time derivative value of the unsprung displacement of the predicted passage position of the front wheel differs depending on the embodiments, procedures for acquiring these will be described later.

The ECU 30 calculates a target control force Fcft of the front wheel by applying the unsprung displacement z1(tp+tpf) and the time differential value dz1(tp+tpf) to the following equation (7) corresponding to the above equation (6).

$$Fcft = \beta1f \times z1 + \beta2f \times z1 \qquad (7)$$

Further, the ECU 30 transmits a control command including the target control force Fcft to the front wheel active actuator 17F so that the front wheel active actuator 17F generates a control force Fcf corresponding to the target control force Fcft.

Figure 5:
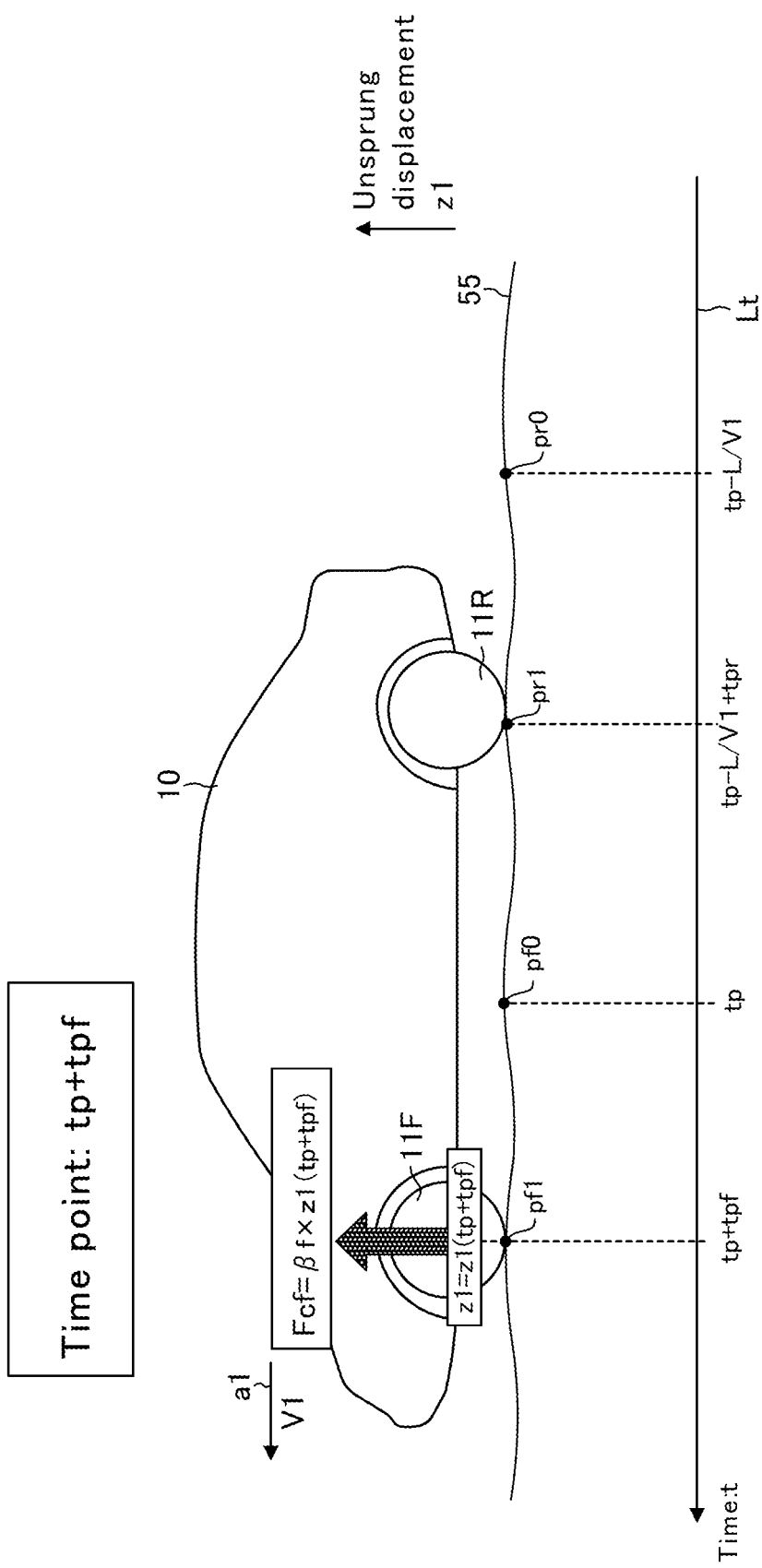
FIG. 5 is a diagram for explaining vibration damping control.

As shown in FIG. 5, the front wheel active actuator 17F generates a control force Fcf corresponding to the target control force Fcft at a time tp+tpf after the front wheel foresee time tpf from the present time tp (that is, at a timing when the front wheel 11F actually passes through the predicted passage position pf1). Therefore, the front wheel active actuator 17F generates a control force Fcf at an appropriate timing to absorb an excitation force generated due to the unsprung displacement z1 of the predicted passage position pf1 of the front wheel 11F, and can appropriately reduce the vibration of the sprung 51.

<Preview Damping Control of Rear Wheel 11R>

The ECU 30 specifies a predicted passage position pr1 of the rear wheel 11R at a time point after the rear wheel foresee time tpr from the present time tp (in the future). The rear wheel foresee time tpr is set in advance as a time required for the rear wheel active actuator 17R to output a control force Fcr corresponding to the target control force Fcrt after the ECU 30 identifies the predicted passage position pr1.

When the front wheel active actuator 17F and the rear wheel active actuator 17R are different active actuators, the front wheel foresee time tpf and the rear wheel foresee time tpr are set to different values in advance. When the front wheel active actuator 17F and the rear wheel active actuator 17R are the same active actuator, the front wheel foresee time tpf and the rear wheel foresee time tpr are preset to the same values.

The ECU 30 specifies a position spaced from a position pf0 at the present time tp by a rear wheel foresee distance Lpr (=V1×tpr) along a predicted movement course of the rear wheel 11R assuming that the rear wheel 11R follows the same course as the front wheel 11F as the predicted passage position pr1. The unsprung displacement z1 of the predicted passage position pr1 is the unsprung displacement z1 at a time point (tp−L/V1+tpr) after the rear wheel foresee time tpr from the time (tp−L/V1) when the front wheel 11F was located at the position pr0 of the rear wheel 11R at the present time.

Therefore, the ECU 30 acquires an unsprung displacement of the predicted rear wheel passage position pr1 as the unsprung displacement z1(tp−L/V1+tpr). Further, the ECU 30 calculates a time derivative value dz1(tp−L/V1+tpr) of the unsprung displacement z1(tp−L/V1+tpr). Since the acquisition of the unsprung displacement of the predicted rear wheel passage position and the time derivative value of the unsprung displacement differs depending on the embodiments, procedures for acquiring these will also be described later.

The ECU 30 is used to calculate a target control force Fcrt for the rear wheel by applying the unsprung displacement z1(tp−L/V1+tpr) and the time differential value dz1(tp−L/V1+tpr) to the following equation (8) corresponding to the above equation (6).

$$Fcrt = \beta1r \times dz1 + \beta2r \times z1 \qquad (8)$$

Further, the ECU 30 transmits a control command including the target control force Fcrt to the rear wheel active actuator 17R so that the rear wheel active actuator 17R generates a control force Fcr corresponding to the target control force Fcrt.

Figure 6:
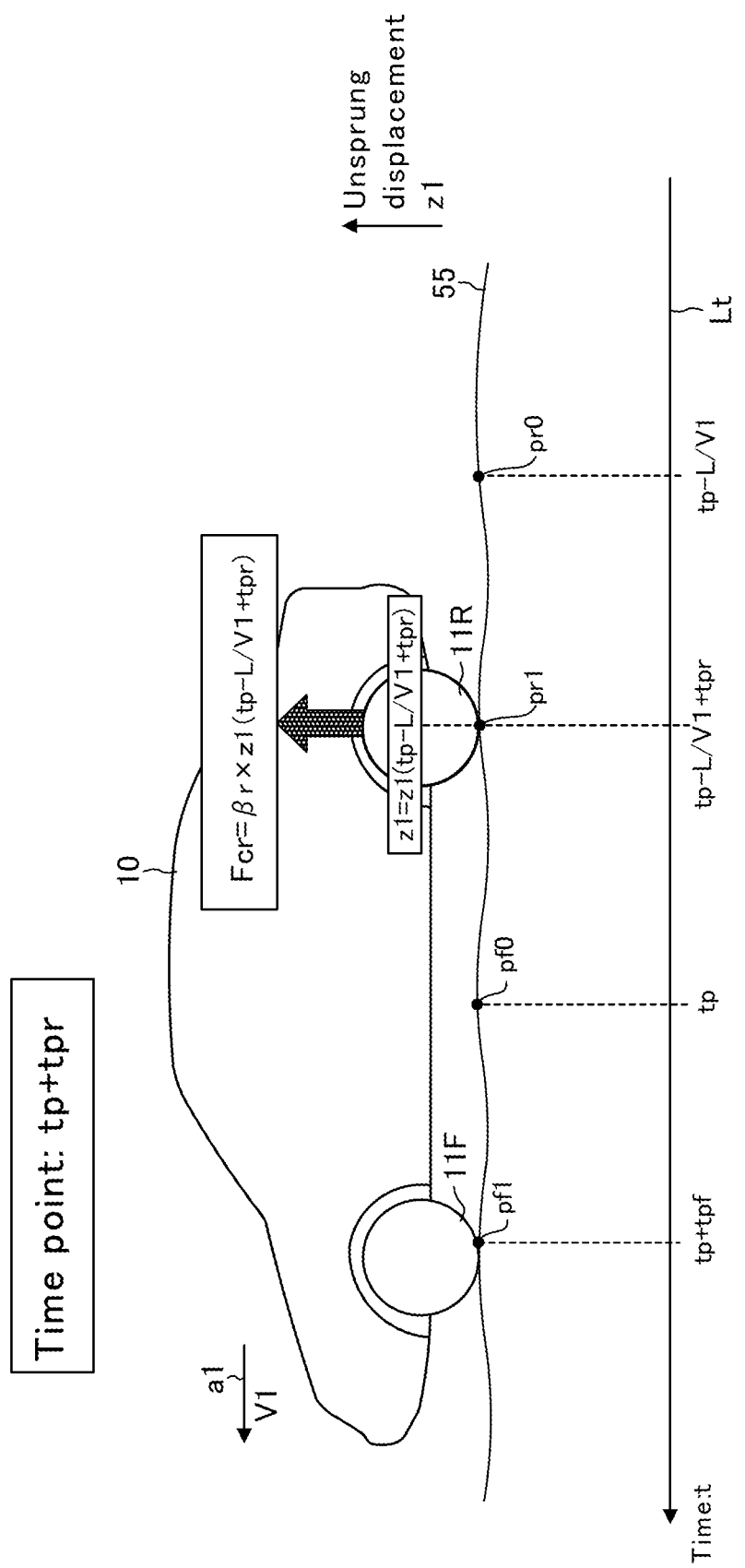
FIG. 6 is a diagram for explaining vibration damping control.

As shown in FIG. 6, the rear wheel active actuator 17R generates a control force Fcr corresponding to the target control force Fcrt at a time tp+tpr that is after the rear wheel foresee time tpr from the present time tp. Therefore, the rear wheel active actuator 17R generates a control force Fcr at an appropriate timing to absorb an excitation force generated due to the unsprung displacement z1 of the predicted passage position pr1 of the rear wheel 11R, and can appropriately reduce the vibration of the sprung 51.

(Outline of Operation of the First Embodiment)

Next, the outline of the operation of the damping control apparatus 20 of the first embodiment will be described.

The position information acquisition device 33 functions as a vehicle information acquisition device that acquires information on the position of the vehicle. The ECU 30 acquires information about the present position of the vehicle 10 from the position information acquisition device 33, and specifies the present position of each wheel 11, the vehicle speed V1, and the traveling direction Td of the vehicle 10.

As will be described in detail later, the ECU 30 determines a predicted wheel passage position where each wheel is predicted to pass based on the present position of each wheel 11, the vehicle speed V1, and the traveling direction Td of the vehicle 10, and acquires an unsprung displacement z1si at a predicted passage position of each wheel based on a road surface displacement in front of the vehicle detected by the preview sensor 31. Further, the ECU 30 calculates time derivative values dz1si of the unsprung displacements z1si based on the unsprung displacements z1si. Notably, i is fl, fr, rl and rr, which mean the left front wheel, the right front wheel, the left rear wheel and the right rear wheel, respectively.

The ECU 30 further performs high-pass filter processing on the time derivative values dz1si, and acquires time derivative values dz1sif after the high-pass filter processing.

Further, the ECU 30 acquires an unsprung displacement z1ci at a predicted passage position of each wheel from the cloud 40, further performs low-pass filter processing on the unsprung displacements z1ci, and acquires unsprung displacements z1cif after the low-pass filter processing.

The ECU 30 calculates target control forces Fcit for damping the sprung at the positions of the left and right front wheels and the left and right rear wheels, according to the following equations (9) and (10) corresponding to the above equations (7) and (8), respectively. Each target control force Fcit (i=fl, fr) of the left and right front wheels is a sum of a first control component β1f(dz1sif+dz1cif) proportional to a sum dz1sif+dz1cif of time derivative values and a second control component β2f(z1sif+z1cif) proportional to a sum z1sif+z1cif of unsprung displacements. Similarly, each target control force Fcit (i=rl, rr) of the left and right rear wheels is a sum of a first control component β1r(dz1sif+dz1cif) proportional to a sum dz1sif+dz1cif of time derivative values and a second control component β2r(z1sif+z1cif) proportional to a sum z1sif+z1cif of unsprung displacements.

$$Fcit=\beta1f(dz1sif+dz1cif)+\beta2f(z1sif+z1cif) \quad (9)$$

$$Fcit=\beta1r(dz1sif+dz1cif)+\beta2r(z1sif+z1cif) \quad (10)$$

The gains β1f and β2f and the gains β1r and β2r in the equations (9) and (10) are expressed as different values from each other in the equations. This is because it is considered that the damping coefficients Cf and Cr of the shock absorbers of the front wheels and the rear wheels may be different from each other, and the spring constants Kf and Kr of the suspensions of the front wheels and the rear wheels may be different from each other.

Further, the ECU 30 controls each active actuator 17 so that each active actuator 17 outputs a control force Fci corresponding to the target control force Fcit at the timing when each wheel 11 passes through the corresponding predicted passage position.

(Damping Control Routine of the First Embodiment)

Next, the damping control routine of the first embodiment will be described. The CPU of the ECU 30 (hereinafter, when referred to as "CPU", refers to the CPU of the ECU 30 unless otherwise specified) executes the damping control routine shown in the flowchart of FIG. 7 every time a predetermined time elapses.

Figure 7:
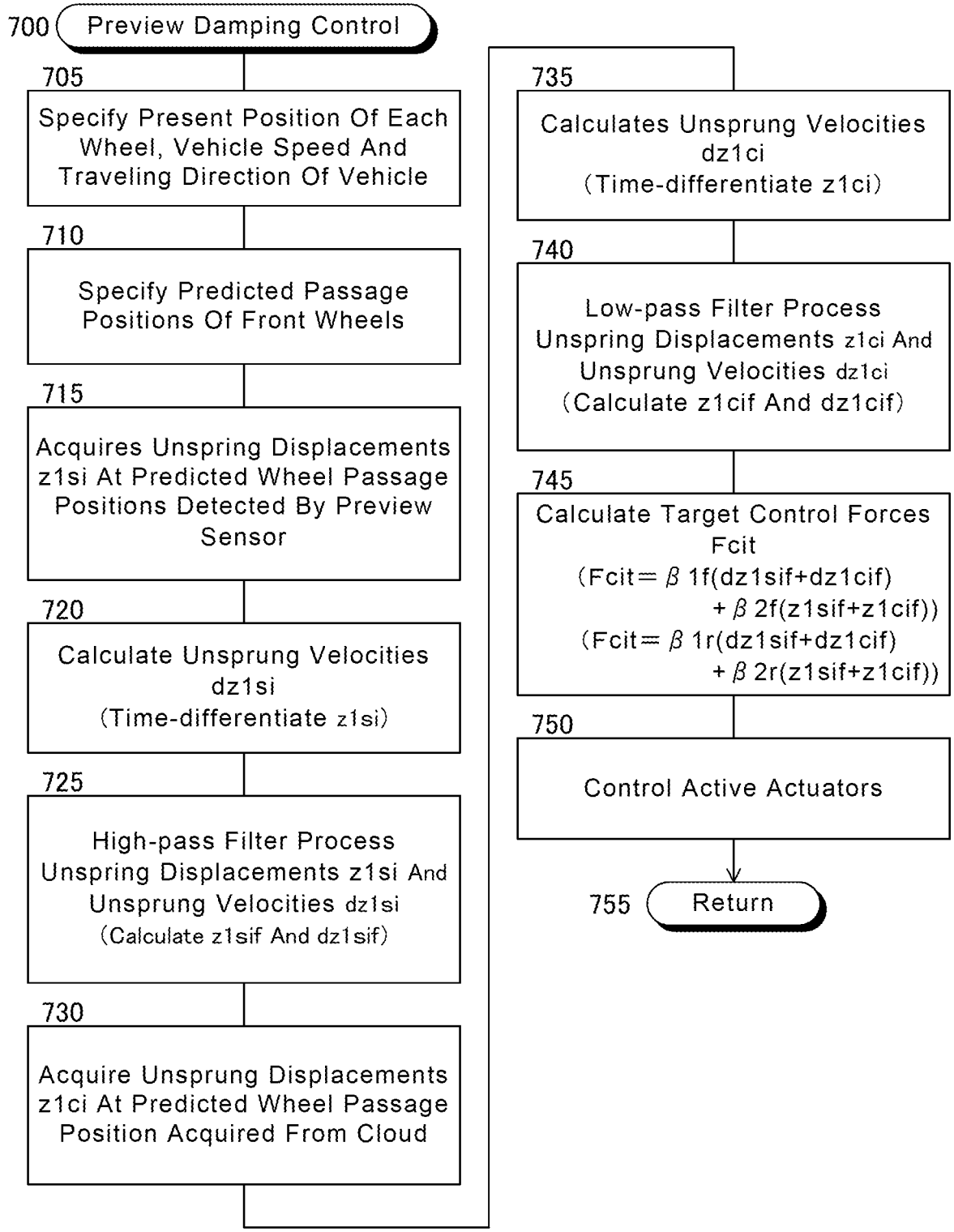
FIG. 7 is a flowchart showing a preview damping control routine for front wheels in the first embodiment.

Therefore, at a predetermined timing, the CPU starts processing from step 700 in FIG. 7 in the order of, for example, the left front wheel, the right front wheel, the left rear wheel, and the right rear wheel, executes steps 705 to 750, and then proceeds to step 755 to temporarily end this routine.

Step 705: The CPU acquires information about the present position of the vehicle 10 from the position information acquisition device 33, and specifies (acquires) a present position of each wheel 11, a vehicle speed V1, and a traveling direction Td of the vehicle 10.

More specifically, the CPU maps a previous cycle present position and a present cycle present position to the road map information included in the map database, and specifies a direction from the previous cycle present position to the present cycle present position as a traveling direction Td of the vehicle 10. The previous cycle present position means the present position of the vehicle 10 acquired by the CPU in step 710 of this routine executed last time. Further, the present cycle present position means the present position of the vehicle 10 acquired by the CPU in step 710 this time.

In the ROM of the ECU 30, positional relationship data representing the relationship between a mounting position of the GNSS receiver in the vehicle 10 and a position of each wheel 11 is stored in advance. Since the present position of the vehicle 10 acquired from the position information acquisition device 33 corresponds to the mounting position of the GNSS receiver, the CPU identifies the present position of each wheel 11 by referring to the present position of the vehicle 10, the traveling direction Td of the vehicle 10, and the positional relationship data.

Further, the GNSS signal received by the position information acquisition device 33 includes information on a moving speed, and the CPU identifies a vehicle speed V1 based on the GNSS signal.

Step 710: The CPU specifies predicted movement courses of the front wheels as described below. The predicted movement courses of the front wheels are courses where the front wheels 11F are predicted to move from now on, and the predicted movement courses of the rear wheels are courses where the rear wheels 11R are predicted to move from now on.

As an example, the CPU specifies the predicted movement courses of the front wheels and the predicted movement courses of the rear wheels based on the present positions of the wheels 11, the traveling direction Td of the vehicle 10, and the positional relationship data.

The CPU specifies courses on which the left and right front wheels 11FL and 11FR are predicted to move when the vehicle 10 travels along the traveling direction Td as predicted movement courses of the left and right front wheels based on the present positions of the front wheels, the traveling direction Td of the vehicle 10, and the positional relationship data.

Further, as described above, the CPU calculates a front wheel foresee distance Lpf by multiplying a vehicle speed V1 by the front wheel foresee time tpf, and specifies a predicted front wheel passage position pf1. Similarly, the CPU calculates a rear wheel foresee distance Lpr by multiplying a vehicle speed V1 by the rear wheel foresee time tpr, and specifies a predicted rear wheel passage position pr1.

More specifically, the CPU specifies the positions where the left and right front wheels 11FL and 11FR advance from their present positions by the front wheel foresee distance Lpf along the predicted movement courses of the left and right front wheels as predicted passage positions pfl1 and pfr1 of the left and right front wheels. Further, the CPU identifies the positions where the left and right rear wheels 11RL and 11RR advance from their present positions by the rear wheel foresee distance Lpr along the predicted movement courses of left and right rear wheels as predicted passage positions prl1 and prr1 of the left and right rear wheels.

Step 715: The CPU acquires unsprung displacements z1si at predicted wheel passage positions, that is, the predicted passage positions of the left and right front wheels and the left and right rear wheels based on the road surface displacements in front of the vehicle detected by the preview sensor 31. In this case, road surface displacements z0si of the predicted wheel passage positions detected by the preview sensor 31 may be acquired as unsprung displacements z1si. Alternatively, road surface displacements in front of the vehicle detected by the preview sensor 31 may temporarily be stored in, for example, a RAM, and road surface displacements z0si at the predicted wheel passage positions may be specified based on the stored road surface displacements, and may be acquired as unsprung displacements z1si.

Step 720: The CPU calculates unsprung velocities dz1si by time-differentiating the unsprung displacements z1si.

Step 725: The CPU performs a high-pass filter processing on the unsprung displacements z1si of the front wheels and the rear wheels at cutoff frequencies fcutf and fcutr, respectively to acquire unsprung displacements z1sif after the high-pass filter processing. Further, the CPU performs high-pass filter processing on the unsprung velocities dz1si of the front wheels and the rear wheels at the cutoff frequencies fcutf and fcutr, respectively to acquire unsprung velocities dz1sif after the high-pass filter processing.

The cutoff frequency fcutf is a frequency (for example, a positive constant of 3 to 5 Hz) between a resonance frequency of the sprung and a resonance frequency of the unsprung corresponding to the front wheels. Similarly, the cutoff frequency fcutr is a frequency (for example, a positive constant of 3 to 5 Hz) between the resonance frequency of the sprung and a resonance frequency of the unsprung corresponding to the rear wheels. The cutoff frequencies fcutf and fcutr may be the same. Further, the cutoff frequency for high-pass filtering the unsprung displacements z1si and the cutoff frequency for high-pass filtering the unsprung velocities dz1si may be different from each other.

Step 730: The CPU acquires information on the unsprung displacements z1ci at the predicted wheel passage positions and the corresponding position information from the unsprung displacements in a preparation section that have been acquired from the preview reference data 45 of the cloud 40.

The preparation section is a section that starts at a predicted passage position pf1 of each front wheel when an end point of the preparation section is reached, and ends at a position spaced from this predicted front wheel passage position pf1 by a predetermined preparation distance along the predicted movement course of the front wheel. Further, the preparation distance is predetermined to be a value that is sufficiently larger than the front wheel foresee distance Lpf.

Step 735: The CPU calculates unsprung velocities dz1ci by time-differentiating the unsprung displacements z1ci.

Step 740: The CPU performs a low-pass filter processing on the unsprung displacements z1ci of the front wheels and the rear wheels at the cutoff frequencies fcutf and fcutr, respectively to acquire unsprung displacements z1cif after the low-pass filter processing. Further, the CPU performs a low-pass filter processing on the unsprung velocities dz1ci of the front wheels and the rear wheels at the cutoff frequencies fcutf and fcutr, respectively to acquire unsprung velocities dz1cif after the low-pass filter processing. The cutoff frequencies for performing the low-pass filter processing of the unsprung displacements z1ci and the unsprung velocities dz1ci may be different from the cutoff frequencies for performing the high-pass filter processing on the unsprung displacements z1si and the unsprung velocities dz1si.

Step 745: For the left and right front wheels, the CPU calculates target control forces Fcit (i=fl, fr) of the active actuators 17FL and 17FR of the left and right front wheels according to the above equation (9). Similarly, for the left and right rear wheels, the CPU calculates target control forces Fcit (i=rl, rr) of the active actuators 17RL and 17RR of the left and right rear wheels according to the above equation (10).

Step 750: The CPU transmits a control command including each target control force Fcit to the corresponding active actuator 17. Thus, the control force Fci of each wheel generated by the active actuator 17 is controlled to be the corresponding target control force Fcit.

As can be understood from the above, in the first embodiment, the damping control apparatus 20 acquires unsprung displacements z1si based on road surface displacements in front of the vehicle detected by the preview sensor 31. Further, the damping control apparatus 20 calculates unsprung velocities dz1si, which are time derivative values of the unsprung displacements z1si, and acquires unsprung displacements z1sif and unsprung velocities dz1sif after the high-pass filter processing. Further, the damping control apparatus 20 acquires unsprung displacements z1ci from the cloud 40, calculates unsprung velocities dz1ci which are time derivative values of the unsprung displacements z1ci, and acquires unsprung displacements z1cif and unsprung velocities dz1cif after the low-pass filter processing.

The damping control apparatus 20 uses the unsprung displacement z1sif and the unsprung velocity dz1sif after the high-pass filter processing and the unsprung displacement z1cif and the unsprung velocity dz1cif after the low-pass filter processing to calculate target control forces Fcit of the left and right front wheels and the left and right rear wheels according to the above equations (9) and (10). Further, the damping control apparatus 20 performs the preview damping control by controlling the active actuators 17 so that control forces Fci become the target control forces Fcit.

Unsprung displacements z1ci and unsprung velocities dz1ci have a higher possibility that a position where a control force corresponding to a target control force is generated misaligns with a predicted wheel passage position as compared with unsprung displacements z1si and unsprung velocities dz1si. Therefore, according to the first embodiment, unsprung displacements z1si and unsprung velocities dz1si as the first road surface displacement-related values are high-pass filtered, and unsprung displacements z1ci and unsprung velocities dz1ci as the second road surface displacement-related values are low-pass filtered.

Since the unsprung displacements z1ci and the unsprung velocities dz1ci are low-pass filtered, in a high frequency region, it is possible to reduce an error of damping control due to misalignment of positions, and in a low to medium frequency region, it is possible to calculate highly accurate target control forces mainly based on the unsprung displacements z1ci and the unsprung velocities dz1ci. Further, since the unsprung displacements z1si and the unsprung velocities dz1si are high-pass filtered, target control forces can be calculated mainly based on the unsprung displacements z1si and the unsprung velocities dz1si in the high frequency region.

Further, as compared to where the unsprung displacements z1ci and the unsprung velocities dz1ci are not low-pass filtered, and the unsprung displacements z1si and the unsprung velocities dz1si are not high-pass filtered, it is possible to reduce a possibility that the error of the above occurs. Further, it is possible to reduce a possibility that target control forces are insufficient as compared to where target control forces are calculated based only on the unsprung displacements z1ci and the unsprung velocities dz1ci after the low-pass filter processing.

Second Embodiment

Figure 8:
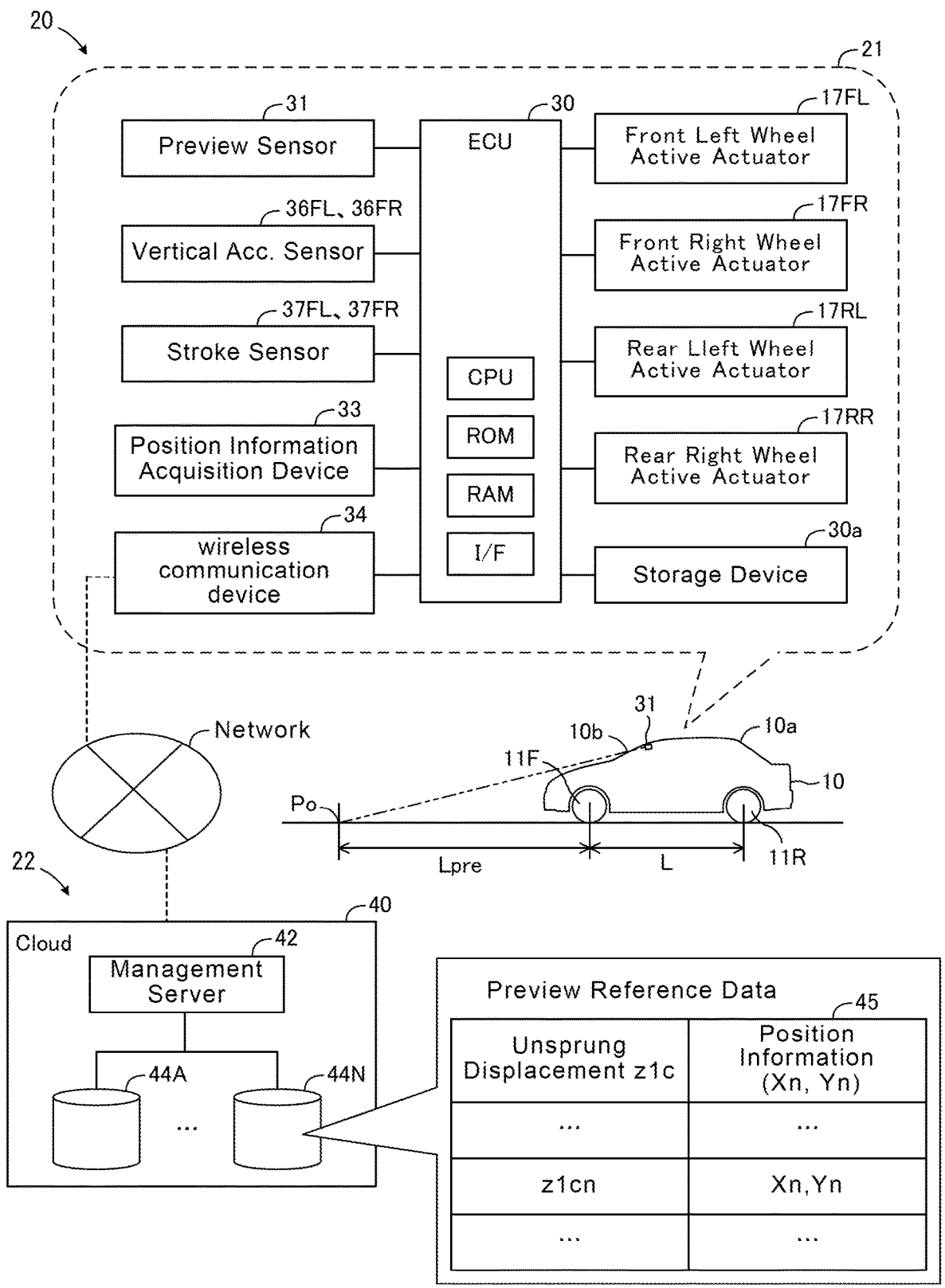
FIG. 8 is a schematic configuration diagram of a damping control apparatus according to the second embodiment of the present disclosure.

In the damping control apparatus 20 according to the second embodiment shown in FIG. 8, the on-board device 21 is provided with vertical acceleration sensors 36FL and 36FR and stroke sensors 37FL and 37FR on the sprung correspondingly to the left and right front wheels in addition to the constituent members of the first embodiment. These vertical acceleration sensors and stroke sensors are also connected to the ECU 30. The damping control apparatus 20 is configured in the same manner as the damping control apparatus 20 according to the first embodiment, except that the above sensors are added to the on-board device 21.

The vertical acceleration sensors 36FL and 36FR on the sprung are provided at portions of the vehicle body 10a (sprung 51) corresponding to the left front wheel 11FL and the right front wheel 11FR, respectively. The vertical acceleration sensors 36FL and 36FR on the sprung detect the vertical accelerations (sprung accelerations ddz2fl and ddz2fr) of the corresponding portions of the sprung 51, respectively, and output signals representing the vertical accelerations to the ECU 30. The vertical acceleration sensors 36FL and 36FR are referred to as a "vertical acceleration sensor 36" when it is not necessary to distinguish them. Similarly, the sprung accelerations ddz2fl and ddz2fr are referred to as a "sprung acceleration ddz2".

The stroke sensors 37FL and 37FR are provided on the left front wheel suspension 13FL and the right front wheel suspension 13FR, respectively. The stroke sensors 37FL and 37FR detect vertical strokes Hfl and Hfr of the suspensions 13FL and 13FR, respectively, and output signals indicating the vertical strokes to the ECU 30. The strokes Hfl and Hfr are vertical strokes between the vehicle body 10a (sprung 51) and the wheel support members 12FL and 12FR (unsprung 50) corresponding to the positions of the left front wheel 11FL and the right front wheel 11FR, respectively. The stroke sensors 37FL and 37FR are referred to as a "stroke sensor 37" when it is not necessary to distinguish between them. Similarly, strokes Hfl and Hfr are referred to as a "stroke H".

(Damping Control Routine of the Second Embodiment)

The damping control for the left front wheel 11FL and the right front wheel 11FR is executed by the ECU 30 at predetermined time intervals according to the damping control routine shown in the flowchart of FIG. 7, as in the first embodiment. On the other hand, the damping control for the left rear wheel 11RL and the right rear wheel 11RR is executed at predetermined time intervals according to the damping control routine shown in the flowchart of FIG. 9. The damping control may be repeatedly executed, for example, in the order of the left front wheel, the right front wheel, the left rear wheel, and the right rear wheel.

Figure 9:
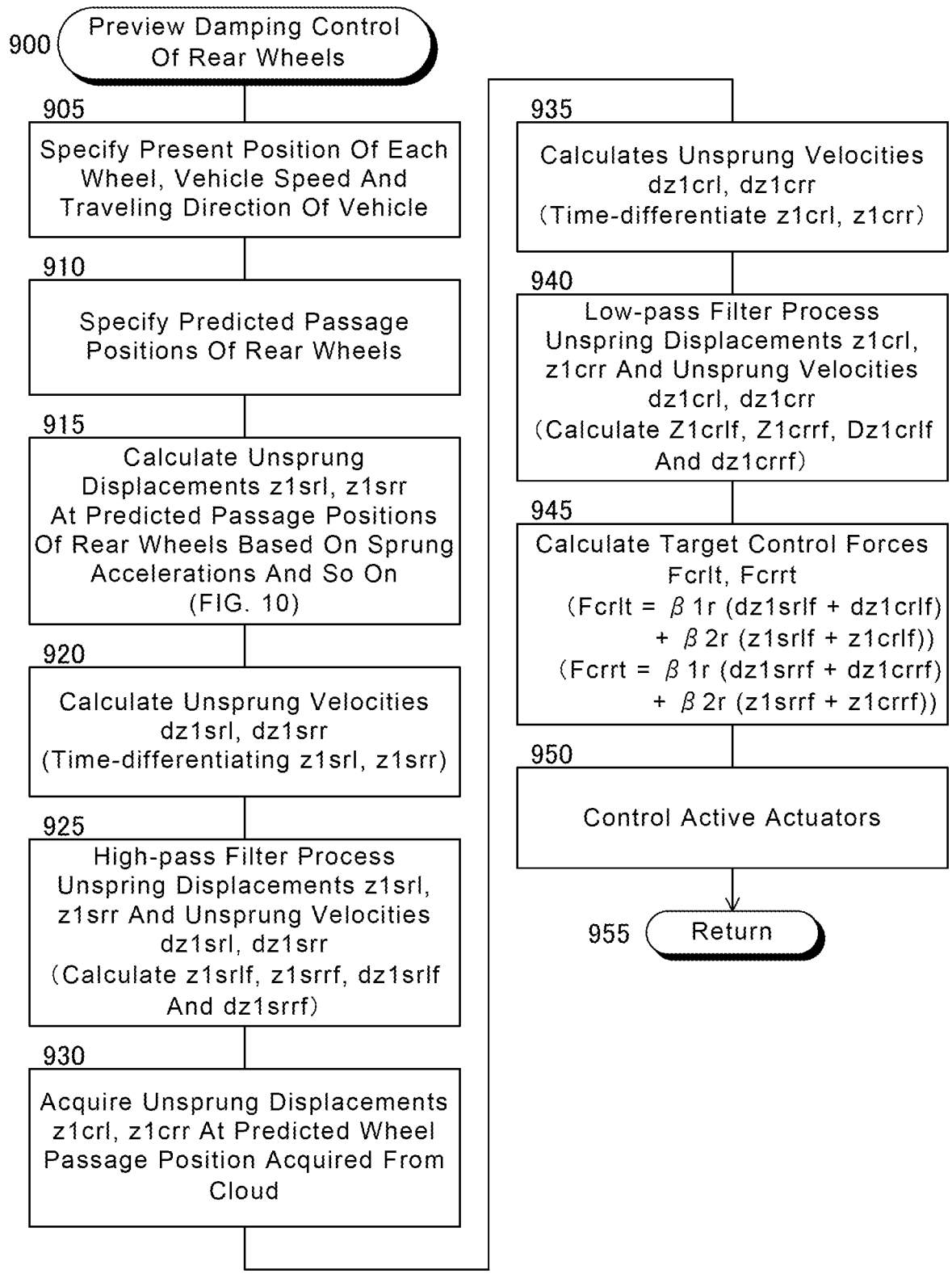
FIG. 9 is a flowchart showing a preview damping control routine for rear wheels in the second embodiment.

The CPU of the ECU 30 starts processing from step 900 shown in FIG. 9, executes steps 905 to 950, and then proceeds to step 955 to temporarily end this routine. In particular, in step 915, the CPU calculates unsprung displacements z1srl and z1srr at the predicted passage positions of the left and right rear wheels based on sprung accelerations ddz2fl and ddz2fr, etc., according to the subroutine shown in the flowchart of FIG. 10.

As can be seen from the comparison between FIGS. 9 and 7, the CPU executes step 905 in the same manner as in step 705 of the first embodiment, and executes step 910 in the same manner as in step 710 to specify predicted passage positions of the rear wheels. Further, the CPU executes steps 920 to 950 for the left rear wheel and the right rear wheel, respectively, in the same manner as in steps 720 to 750 of the first embodiment. Therefore, detailed description of steps 905, 910, 920 to 950 will be omitted. In step 945, target control forces Fcrlt and Fcrrt of the left rear wheel 11RL and the right rear wheel 11RR are calculated according to the following equations (11) and (12), respectively, corresponding to the above equation (10).

$$Fcrlt = \beta 1r(dz1srlf + dz1crlf) + \beta 2r(z1srlf + z1crlf) \quad (11)$$

$$Fcrrt = \beta 1r(dz1srrf + dz1crrf) + \beta 2r(z1srrf + z1crrf) \quad (12)$$

Figure 10:
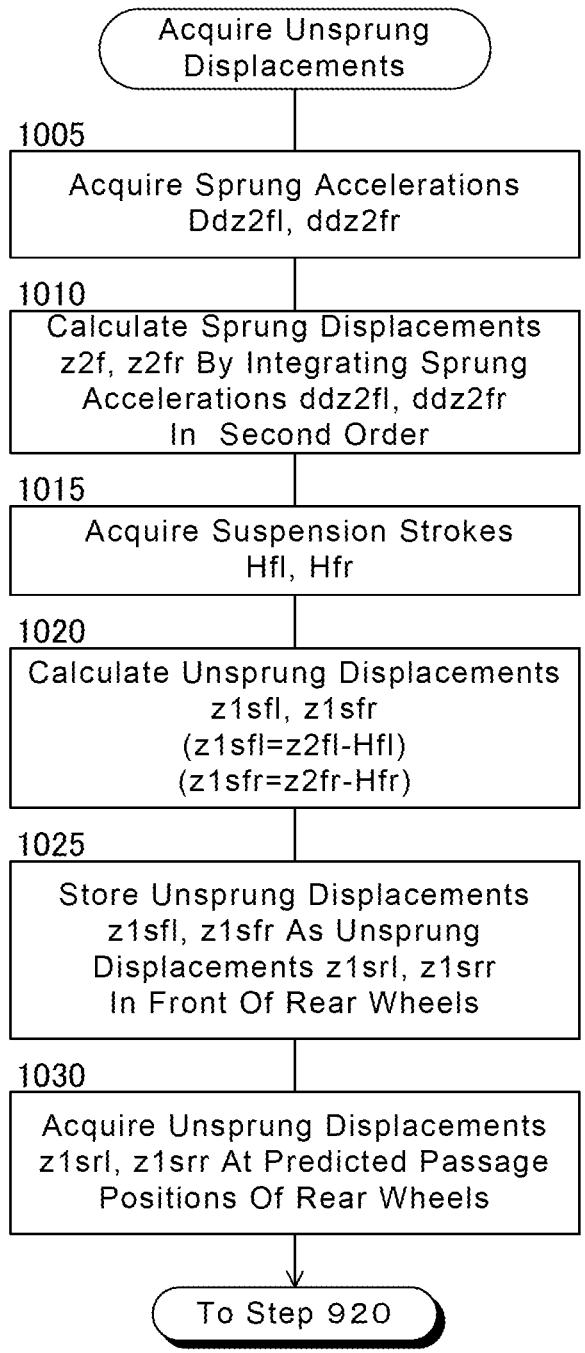
FIG. 10 is a flowchart showing a subroutine executed in step 915 shown in FIG. 9.

In step 915, the CPU executes steps 1005 to 1030 shown in FIG. 10, and proceeds to step 920 when step 1030 is completed.

Step 1005: The CPU acquires accelerations ddz2fl and ddz2fr of the sprung from the vertical acceleration sensors 36FL and 36FR, respectively.

Step 1010: The CPU calculates sprung displacements z2fl and z2fr by integrating the sprung accelerations ddz2fl and ddz2fr acquired in step 1005 in the second order.

Step 1015: The CPU acquires suspension strokes Hfl and Hfr from the stroke sensors 37FL and 37FR, respectively.

Step 1020: The CPU calculates unsprung displacements z1sfl and z1sfr at the positions of the left and right front wheels by subtracting the suspension strokes Hfl and Hfr from the sprung displacements z2fl and z2fr, respectively. That is, the CPU calculates unsprung displacements z1sfl and z1sfr at the positions of the left and right front wheels according to the following equations (13) and (14), respectively.

$$z1sfl = z2fl - Hfl \quad (13)$$

$$Z1sfr = z2fr - Hfr \quad (14)$$

Step 1025: The CPU stores the unsprung displacements z1sfl and z1sfr in the storage device 30a as unsprung displacements z1srl and z1srr in front of the left and right rear wheels in association with the information on the positions of the left and right front wheels when the sprung accelerations ddz2fl and ddz2fr are detected, respectively.

Step 1030: The CPU identifies and acquires unsprung displacements z1srl and z1srr at predicted passage positions of the left and right rear wheels specified in step 910 in the flowchart of FIG. 9 among the unsprung displacements z1srl and z1srr in front of the left and right rear wheels stored in the storage device 30a.

As can be understood from the above, in the second embodiment, the damping control apparatus 20 executes the damping control for the left front wheel 11FL and the right front wheel 11FR in the same manner as in the first embodiment. Therefore, by the damping control for the left and right front wheels, it is possible to obtain the same effect as that of the first embodiment.

For the left rear wheel 11RL and the right rear wheel 11RR, the damping control apparatus 20 acquires unsprung displacements z1srl and z1srr at predicted passage positions of the left and right rear wheels that are calculated based on sprung accelerations ddz2fl and ddz2fr at the positions of the left and right front wheels and strokes Hfl and Hfr of the suspensions. Therefore, the ECU 30 cooperates with the vertical acceleration sensors 36 and the stroke sensors 37, which are on-board sensors, to function as road surface displacement-related information acquisition device that acquires road surface displacement-related information in front of the left and right rear wheels based on the detection results of these sensors.

Unsprung displacements z1ci and unsprung velocities dz1ci for the left and right rear wheels have a higher possibility that a position where a control force corresponding to a target control force is generated deviates from a predicted wheel passage position as compared with unsprung displacements z1si and unsprung velocities dz1si. Therefore, also in the second embodiment, unsprung displacements z1si and unsprung velocities dz1si as the first road surface displacement-related values are high-pass filtered, and road surface displacement-related information unsprung displacements z1ci and unsprung velocities dz1ci as the second road surface displacement-related values are low-pass filtered. Thus, according to the second embodiment, the same effects as those of the first embodiment can be obtained for the left and right rear wheels.

In the second embodiment described above, unsprung displacements z1srl and z1srr are calculated in steps 1005 to 1020, and unsprung velocities dz1srl and dz1srr are calculated by time-differentiating unsprung displacements in step 920. However, sprung velocities dz2fl and dz2fr may be calculated by integrating sprung accelerations ddz2fl and ddz2fr, time derivative values dHfl and dHfr of suspension strokes may be calculated, and unsprung velocities dz1srl and dz1srr may be calculated according to the following equations (15) and (16). Further, unsprung displacements z1srl and z1srr may be calculated by integrating the unsprung velocities dz1srl and dz1srr, respectively.

$$dz1srl = dz2fl - dHfl \tag{15}$$

$$dz1srr = dz2fr - dHfr \tag{16}$$

Third Embodiment

Figure 11:
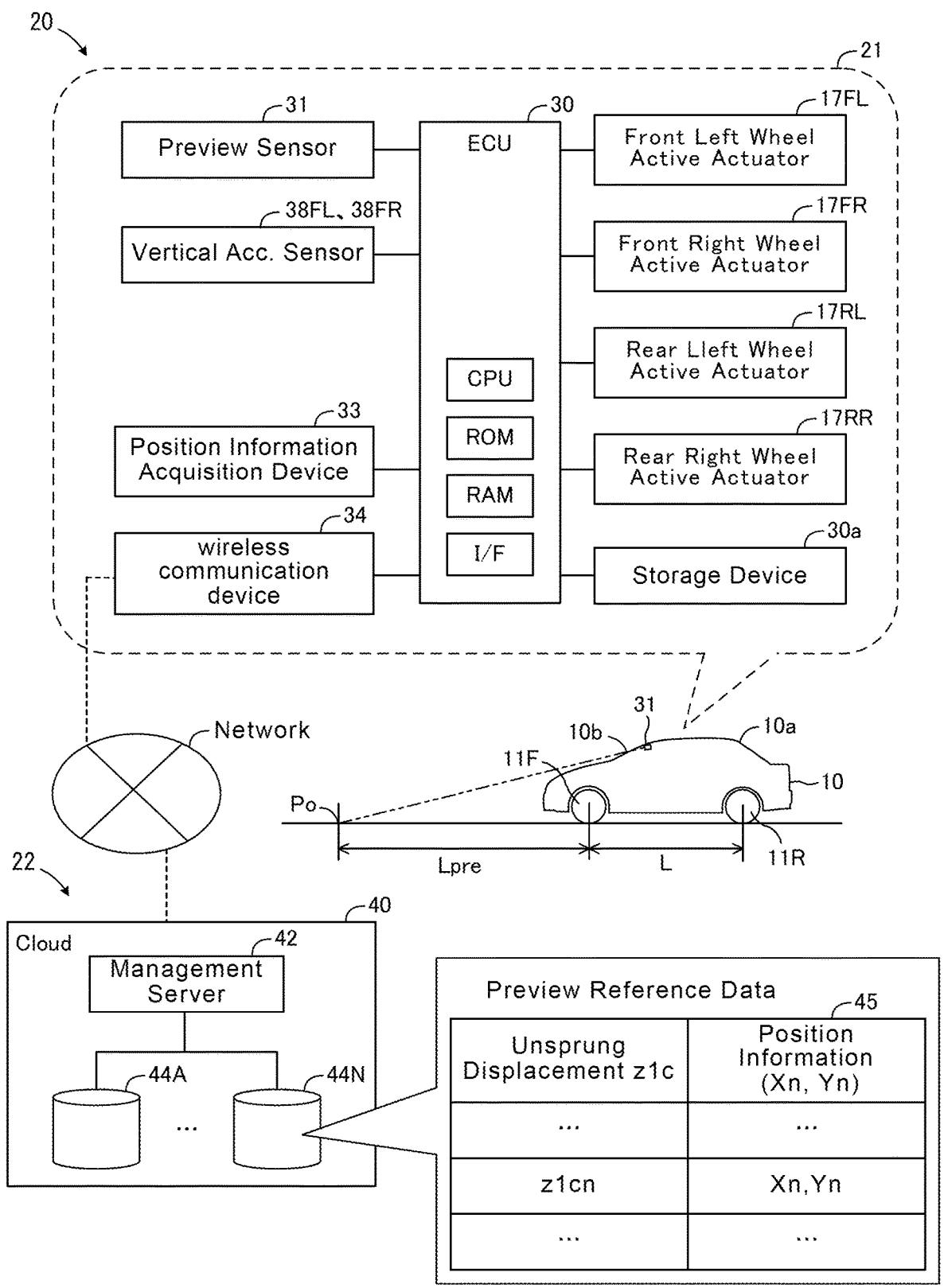
FIG. 11 is a schematic configuration diagram of a damping control apparatus according to the third embodiment of the present disclosure.

In the damping control apparatus 20 according to the third embodiment shown in FIG. 11, the on-board device 21 is provided with unsprung vertical acceleration sensors 38FR and 38FR corresponding to the left and right front wheels in addition to the constituent members of the first embodiment. These sensors are also connected to the ECU 30. The damping control apparatus 20 is configured in the same manner as the damping control apparatus 20 according to the first embodiment, except that the unsprung vertical acceleration sensors are added to the on-board device 21.

The unsprung vertical acceleration sensors 38FL and 38FR are provided on the unsprung 50 corresponding to the left front wheel 11FL and the right front wheel 11FR, respectively. The vertical acceleration sensors 38FL and 38FR detect vertical accelerations of the unsprungs 50 (unsprung accelerations ddz1fl and ddz1fr, respectively), and output signals representing the vertical accelerations to the ECU 30. The vertical acceleration sensors 38FL and 38FR are referred to as a "vertical acceleration sensor 38" when it is not necessary to distinguish between them. Similarly, the unsprung accelerations ddz1fl and ddz1fr are referred to as an "unsprung accelerations ddz1".
(Damping Control Routine of the Third Embodiment)

The damping control corresponding to the left front wheel 11FL and the right front wheel 11FR is executed by the ECU 30 at predetermined time intervals according to the damping control routine shown in the flowchart of FIG. 7, as in the first embodiment. On the other hand, the damping control corresponding to the left rear wheel 11RL and the right rear wheel 11RR is executed at predetermined time intervals according to the damping control routine shown in the flowchart of FIG. 12. The damping control may be repeatedly executed, for example, in the order of the left front wheel, the right front wheel, the left rear wheel, and the right rear wheel.

Figure 12:
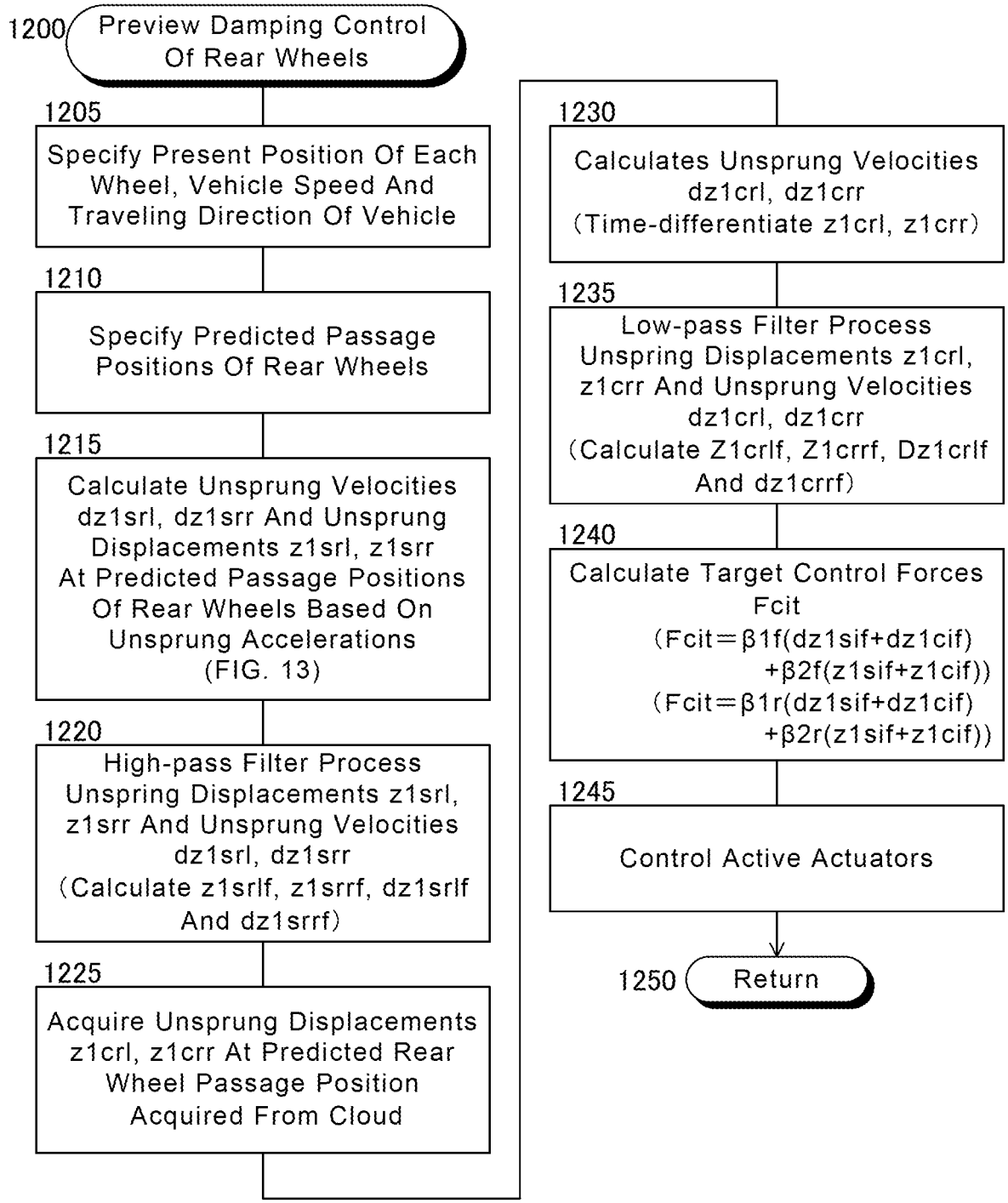
FIG. 12 is a flowchart showing a preview damping control routine for rear wheels in the third embodiment.

The CPU of the ECU 30 starts processing from step 1200 shown in FIG. 12, executes steps 1205 to 1245, and then proceeds to step 1250 to temporarily end this routine. In particular, in step 1215, according to the subroutine shown in the flowchart of FIG. 13, the CPU calculates to acquire unsprung velocities dz1rl and dz1rr and unsprung displacements z1srl and z1srr at the predicted passage positions of the left and right rear wheels based on the unsprung accelerations ddz1fl and ddz1fr.

As can be seen from the comparison between FIG. 12 and FIGS. 7 and 9, the CPU executes step 1205 in the same manner as in step 705 of the first embodiment, and then specifies predicted passage positions of the rear wheels by executing step 1210 in the same manner as in step 710. Further, the CPU executes steps 1220 to 1245 for the left rear wheel and the right rear wheel in the same manner as in steps 925 to 950, respectively, of the second embodiment. Therefore, detailed description of steps 1205 and 1210 and steps 1220 to 1245 will be omitted.

Figure 13:
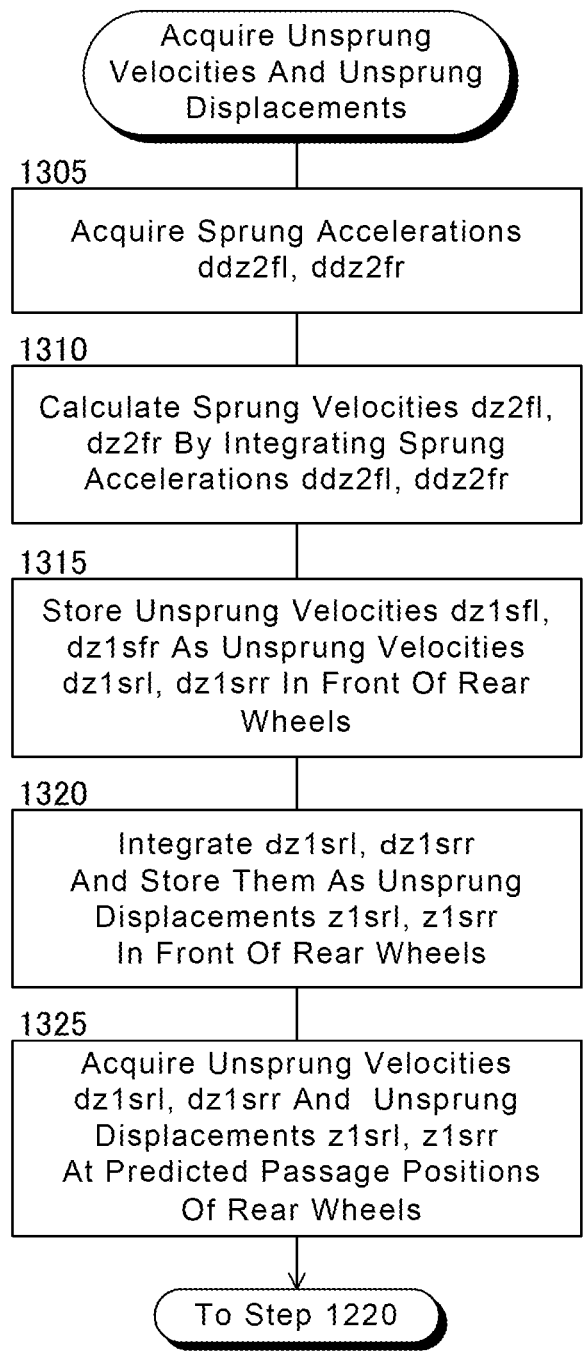
FIG. 13 is a flowchart showing a subroutine executed in step 1215 shown in FIG. 12.

In step 1215, the CPU executes steps 1305 to 1325 shown in FIG. 13, and proceeds to step 1220 when step 1325 is completed.

Step 1305: The CPU acquires unsprung accelerations ddz1sfl and ddz1sfr from the vertical acceleration sensors 38FL and 38FR, respectively.

Step 1310: The CPU calculates unsprung velocities dz1sfl and dz1sfr by integrating the unsprung accelerations ddz1sfl and ddz1sfr, respectively, acquired in step 1305.

Step 1315: The CPU stores the unsprung velocities dz1sfl and dz1sfr in the storage device 30a in association with the information on the positions of the left and right front wheels when the unsprung accelerations ddz1sfl and ddz1sfr are detected, respectively, as unsprung velocities dz1srl and dz1srr in front of the left and right rear wheels.

Step 1320: The CPU calculates unsprung displacements z1srl and z1srr by integrating the unsprung velocities dz1srl and dz1srr. Further, the CPU stores the unsprung displacements z1srl and z1srr in the storage device 30a in association with the information on the positions of the left and right front wheels when the unsprung accelerations ddz1sfl and ddz1sfr are detected, respectively, as the unsprung displacements z1srl and z1srr in front of the left and right rear wheels.

Step 1325: The CPU identifies and acquires unsprung velocities dz1srl and dz1srr at predicted passage positions of the left and right rear wheels specified in step 1210 in the flowchart of FIG. 12 among the unsprung velocities dz1srl and dz1srr in front of the rear wheels stored in the storage device 30a. Further, the CPU identifies and acquires unsprung displacements z1srl and z1srr at the predicted passage positions of the left and right rear wheels among the unsprung displacements z1srl and z1srr in front of the rear wheels stored in the storage device 30a.

As can be understood from the above, in the third embodiment, the damping control apparatus 20 executes the damping control for the left front wheel 11FL and the right front wheel 11FR in the same manner as in the first and second embodiments. Therefore, by the damping control of the left and right front wheels, it is possible to obtain the same effect as that of the first embodiment.

For the left rear wheel 11RL and the right rear wheel 11RR, the damping control apparatus 20 acquires unsprung velocities dz1srl and dz1srr and unsprung displacements z1srl and z1srr at predicted passage positions of the left and right rear wheels calculated based on unsprung accelerations ddz1fl and ddz1fr at the positions of the left and right front wheels, respectively. Therefore, the ECU 30 cooperates with the vertical acceleration sensors 38FL and 38FR which are on-board sensors to function as a road surface displacement-related information acquisition device that acquires road surface displacement-related information in front of the left and right rear wheels based on the detection results of these sensors.

Unsprung displacements z1crl, z1crr and unsprung velocities dz1crl, dz1crr have a higher possibility that a position where a control force corresponding to a target control force is generated misaligns with a predicted wheel passage position as compared with unsprung displacements z1srl, z1srr and unsprung velocities dz1srl, dz1srr. Therefore, also in the third embodiment, unsprung displacements z1srl and z1srr and unsprung velocities dz1srl and dz1srr as the first road surface displacement-related values are high-pass filtered, and unsprung displacements z1crl and z1crr and unsprung velocities dz1crl and dz1crr as the second road surface displacement-related values are low-pass filtered. Thus, according to the third embodiment, the same effect as that of the first embodiment can be obtained for the left and right rear wheels.

In the second and third embodiments, when a vehicle speed V1 of the vehicle 10 is very high and the rear wheel foresee distance Lpr is larger than the wheelbase L of the vehicle, unsprung displacements and unsprung velocities acquired based on the detection result of the preview sensor 31 may be used as unsprung displacements and unsprung velocities at the positions of the rear wheels as for the left and right front wheels.

Fourth Embodiment

Figure 14:
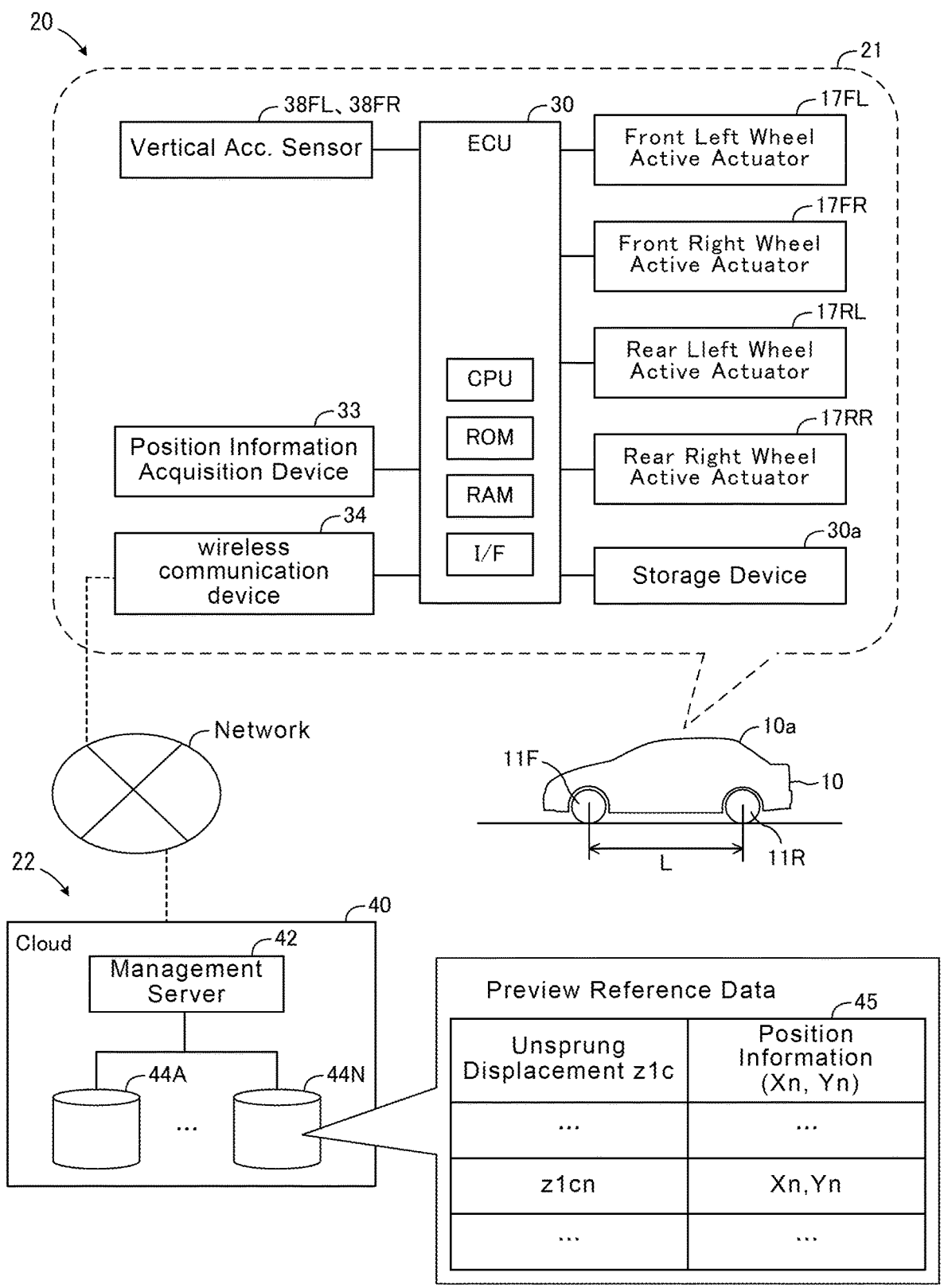
FIG. 14 is a schematic configuration diagram of a damping control apparatus according to the fourth embodiment of the present disclosure.

In the damping control apparatus 20 according to the fourth embodiment shown in FIG. 14, the on-board device 21 is provided with unsprung vertical acceleration sensors 38FL and 38FR corresponding to the left and right front wheels instead of the preview sensor 31 of the first embodiment. These sensors are also connected to the ECU 30. The damping control apparatus 20 has the same configuration as the damping control apparatus 20 according to the first embodiment, except that the on-board device 21 is not provided with the preview sensor 31 and is provided with the unsprung vertical acceleration sensors.

(Damping Control Routine of the Fourth Embodiment)

Figure 15:
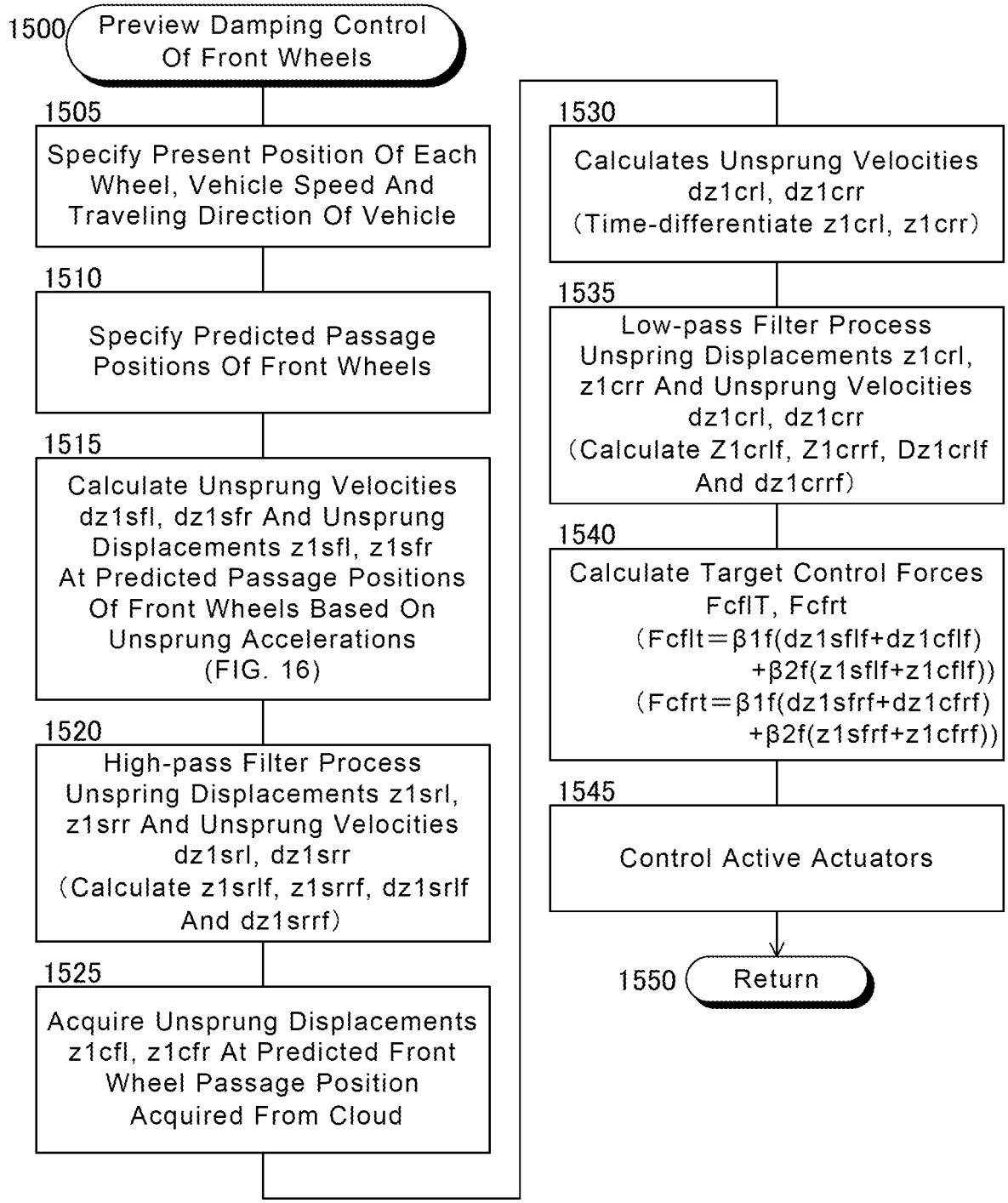
FIG. 15 is a flowchart showing a preview damping control routine for front wheels in the fourth embodiment.

The damping control corresponding to the left front wheel 11FL and the right front wheel 11FR is executed by the ECU 30 at predetermined time intervals according to the damping control routine shown in the flowchart of FIG. 15. On the other hand, the damping control corresponding to the left rear wheel 11RL and the right rear wheel 11RR is executed at predetermined time intervals according to the damping control routine shown in the flowchart of FIG. 16. The damping control may be repeatedly executed, for example, in the order of the left front wheel, the right front wheel, the left rear wheel, and the right rear wheel.

(Preview Damping Control Routine for Front Wheels)

The CPU of the ECU 30 starts processing from step 1500 shown in FIG. 15, executes steps 1505 to 1545, and then proceeds to step 1550 to temporarily end this routine.

As can be seen from the comparison between FIGS. 15 and 7, the CPU executes step 1505 in the same manner as in step 705 of the first embodiment, and executes step 1510 in the same manner as in step 710 to specify predicted passage positions of the front wheels.

Step 1515: The CPU calculates unsprung velocities dz1sfl and dz1sfr and unsprung displacements z1sfl and z1sfr of the left and right front wheels based on unsprung acceleration ddz1fl and ddz1fr according to the subroutine shown in the flowchart of FIG. 16 and stores them in the storage device 30a. Further, the CPU acquires unsprung velocities dz1sfl and dz1sfr and unsprung displacements z1sfl and z1sfr at the predicted passage positions of the left and right front wheels from the unsprung velocities dz1sfl, dz1sfr and the unsprung displacements z1sfl and z1sfr stored in the storage device 30a.

Step 1520: The CPU performs a high-pass filter processing on the unsprung velocities dz1sfl and dz1sfr and the unsprung displacements z1sfl and z1sfr at the cutoff frequency fcutf, and acquires the unsprung velocities dz1sflf and dz1sfrf and the unsprung displacements z1sflf and z1sfrf after the high-pass filter processing.

Step 1525: The CPU acquires unsprung displacements z1cfl and z1cfr at predicted passage positions of the front wheels and the corresponding position information from the unsprung displacements in the preparation section that have been acquired from the preview reference data 45 of the cloud 40.

Step 1530: The CPU calculates unsprung velocities dz1cfl and dz1cfr by time-differentiating the unsprung displacements z1cfl and z1cfr.

Step 1535: The CPU performs a low-pass filter processing on the unsprung velocities dz1cfl, dz1cfr and the unsprung displacements z1cfl, z1cfr of the front wheels at the cutoff frequency fcutf, and acquires unsprung velocities dz1cflf, dz1cfrf and unsprung displacements z1cflf after the low-pass filter processing.

Step 1540: The CPU calculates target control forces Fcflt and Fcfrt of the active actuators 17FL and 17FR of the left and right front wheels according to the above equation (9).

Step 1545: The CPU transmits control commands including target control forces Fcflt and Fcfrt to the active actuators 17FL and 17FR, respectively. Thus, control forces Fcfl and Fcfr of the left and right front wheels generated by the active actuators 17FL and 17FR are controlled to be the target control forces Fcflt and Fcfrt, respectively.

Figure 16:
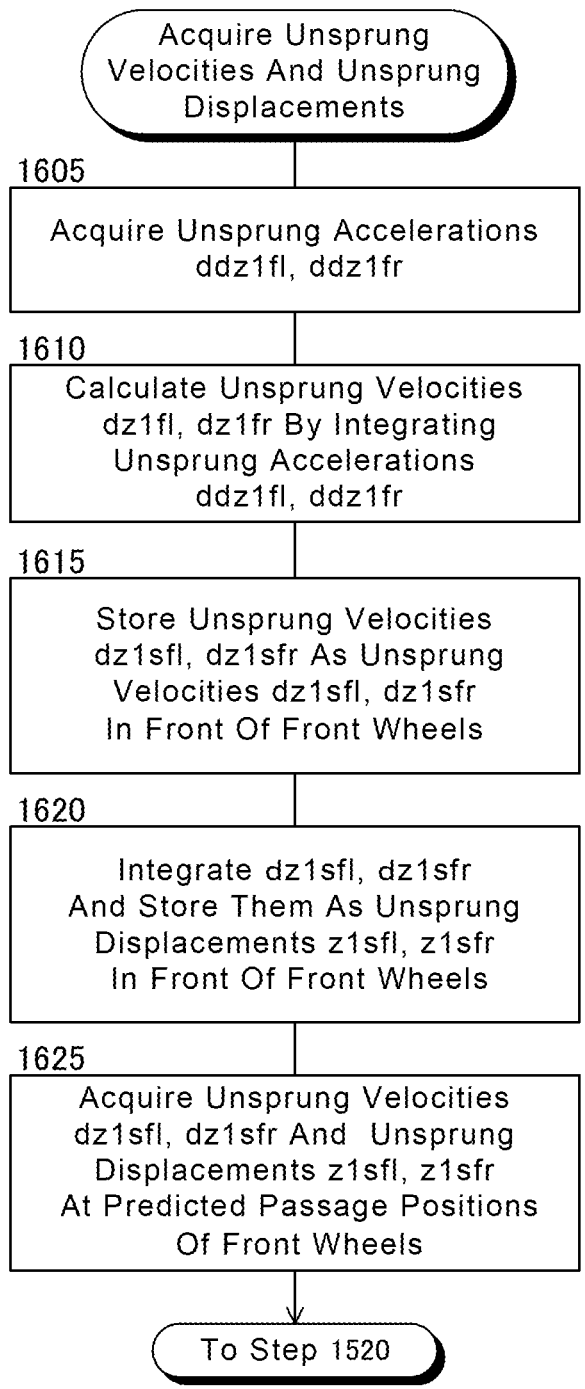
FIG. 16 is a flowchart showing a subroutine executed in step 1515 shown in FIG. 15.

In step 1515, the CPU executes steps 1605 to 1625 shown in FIG. 16, and proceeds to step 1520 when step 1625 is completed. As can be seen from the comparison between FIGS. 16 and 13, the CPU executes steps 1605 to 1625 for the left and right front wheels in the same manner as steps 1305 to 1325 in the third embodiment. Therefore, detailed description of steps 1605 to 1625 will be omitted.

(Damping Control Routine for Rear Wheels)

Figure 17:
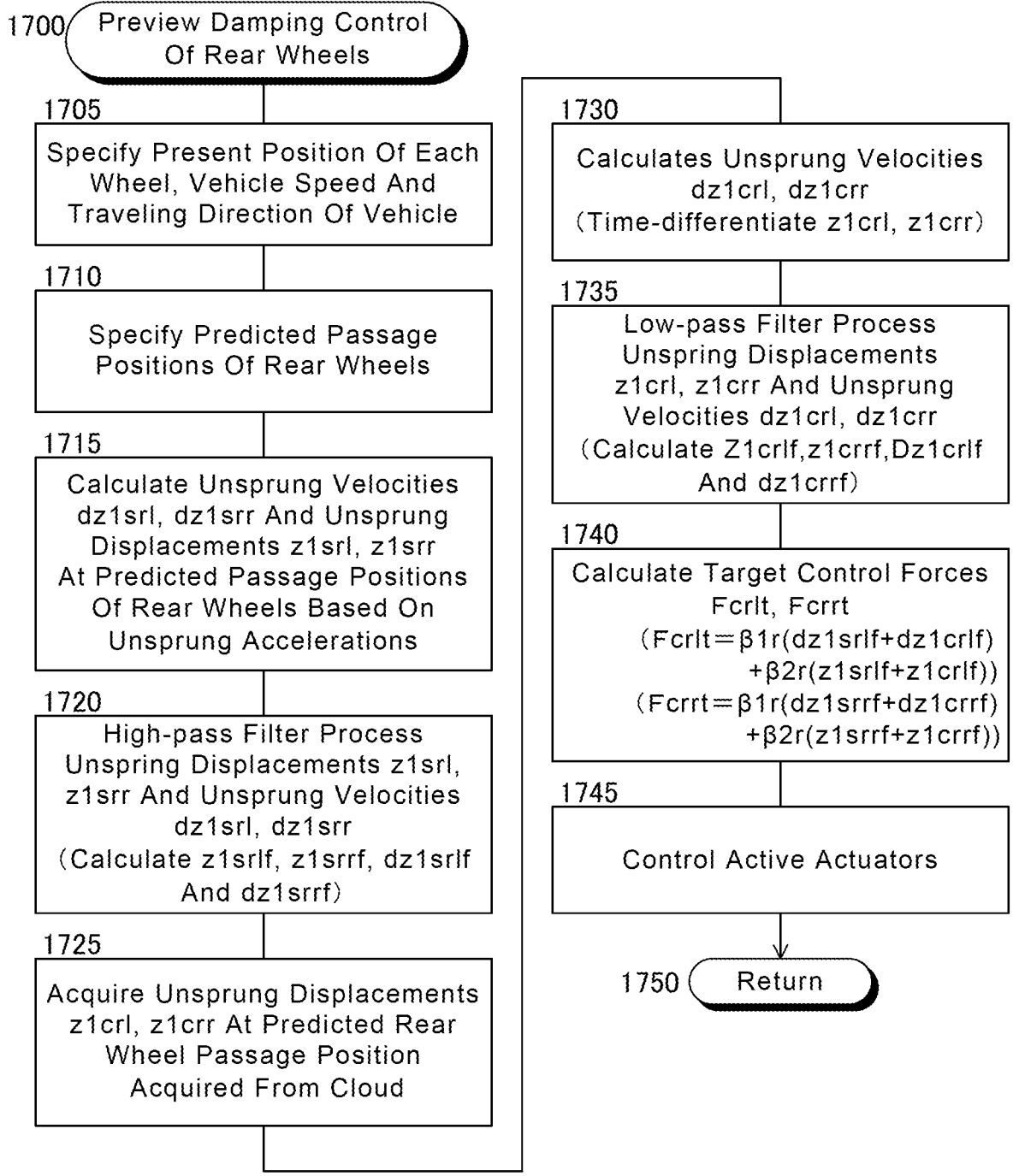
FIG. 17 is a flowchart showing a damping control routine for rear wheels in the fourth embodiment.

The CPU of the ECU 30 starts processing from step 1700 shown in FIG. 17, executes steps 1705 to 1745, and then proceeds to step 1750 to temporarily end this routine.

As can be seen from the comparison between FIGS. 17 and 15, the CPU performs the same control as in steps 1505 to 1545 for the rear wheels in steps 1705 to 1745, respectively. Therefore, detailed description of steps 1705 to 1745 will be omitted.

However, in step 1715, the CPU specifies unsprung velocities and unsprung displacements at the predicted passage positions of the left and right rear wheels among the unsprung velocities dz1sfl and dz1sfr and the unsprung displacements z1sfl and z1sfr stored in the storage device 30a, and acquires them as unsprung velocities dz1srl, dz1srr and the unsprung displacements z1srl, z1srr.

As can be seen from the above, in the fourth embodiment, the damping control apparatus 20 calculates unsprung velocities dz1srl, dz1srr and unsprung displacements z1srl, z1srr based on unsprung accelerations ddz1fl, ddz1fr at the positions of the left and right front wheels. Further, the damping control apparatus 20 acquires unsprung displacements z1cfl and z1cfr from the cloud 40, and calculates unsprung velocities dz1cfl and dz1cfr which are time derivative values of the unsprung displacements. Further, the damping control apparatus 20 uses the unsprung velocities and the unsprung displacements of the left front wheel 11FL and the right front wheel 11FR to damp the sprung at the positions of the left and right front wheels.

Therefore, the damping control of the front wheel positions using the unsprung displacements acquired from the cloud 40 and the unsprung velocities calculated based on the unsprung displacements is the preview damping control, but the damping control of the front wheel positions using unsprung displacements and unsprung velocities calculated based on unsprung accelerations is not the preview damping control. As in the third embodiment, the ECU 30 cooperates with the vertical acceleration sensors 38, which are on-board sensors to function as a road surface displacement-related information acquisition device that acquires road surface displacement-related information in front of the left and right rear wheels based on the detection results of these sensors.

On the other hand, the damping control apparatus 20 specifies unsprung velocities and unsprung displacements at the predicted passage positions of the left and right rear wheels among the unsprung velocities dz1sfl and dz1sfr and the unsprung displacements z1sfl and z1sfr, and acquires them as unsprung velocities dz1srl, dz1srr and unsprung displacements z1srl, z1srr. The damping control apparatus 20 further acquires unsprung displacements z1crl and z1crr from the cloud 40, and calculates unsprung velocities dz1crl and dz1crr which are time-derivative values of the unsprung displacements. Further, for the left rear wheel 11RL and the right rear wheel 11RR, the damping control apparatus 20 uses the unsprung velocities and the unsprung displacements to damp the sprung at the positions of the left and right rear wheels. Therefore, the damping control of the rear wheel position using unsprung displacements acquired from the cloud 40 and unsprung velocities calculated based on the unsprung displacements and the damping control of the rear wheel position using unsprung displacements and unsprung velocities calculated based on unsprung accelerations of the front wheels are both preview damping control.

For both the front wheels and the rear wheels, unsprung displacements z1ci and unsprung velocities dz1ci have a higher possibility that a position where a control force corresponding to a target control force is generated misaligns with a predicted wheel passage position as compared with unsprung displacements z1si and unsprung velocities dz1si. Therefore, also in the fourth embodiment, unsprung displacements z1si and unsprung velocities dz1si as the first road surface displacement-related values are high-pass filtered, and unsprung displacements z1ci and unsprung velocities dz1ci as the second road surface displacement-related values are low-pass filtered. Thus, according to the fourth embodiment, the same effects as those of the first embodiment can be obtained for both the front wheels and the rear wheels.

It is to be noted that unsprung vertical acceleration sensors 38 may be replaced with sprung vertical acceleration sensors 36 and stroke sensors 37, and unsprung velocities dz1sfl, dz1sfr and unsprung displacements z1sfl, z1sfr may be calculated based on sprung acceleration ddz2fl or the like instead of unsprung accelerations ddz1fl, ddz1fr.

Fifth Embodiment

Figure 18:
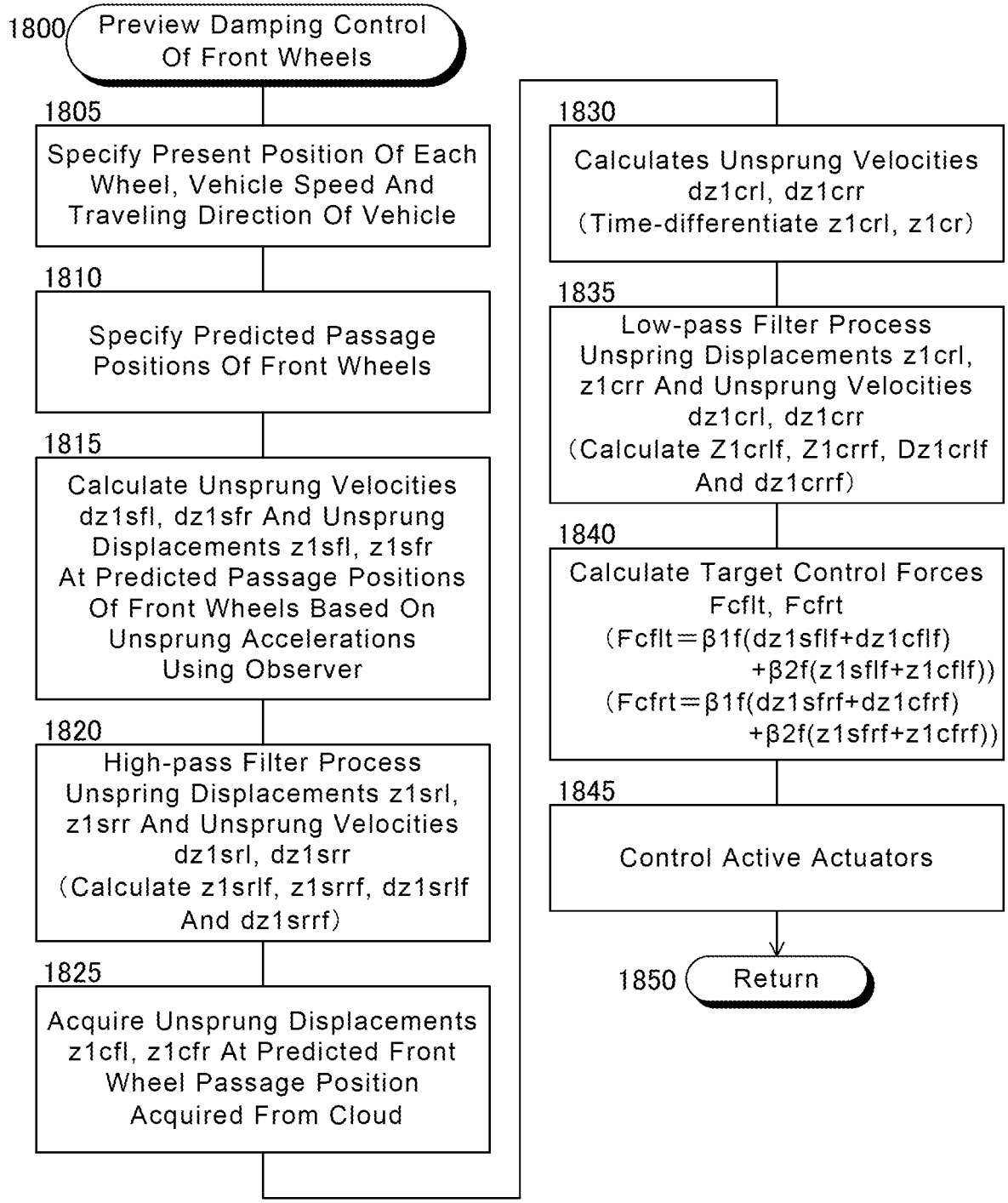
FIG. 18 is a flowchart showing a damping control routine for front wheels in the fifth embodiment.

FIG. 18 shows a damping control routine for the front wheels in the fifth embodiment, which is configured as a modified example of the fourth embodiment. The damping control of the rear wheels may be executed in the same manner as the damping control of the rear wheels in the fourth embodiment.

As can be seen from the comparison between FIGS. 18 and 15, steps 1800 to 1850 are performed in the same manner as steps 1500 to 1550, respectively, except for step 1815.

In step 1815, the CPU acquires unsprung velocities dz1sfl, dz1sfr and unsprung displacements z1sfl, z1sfr using an observer based on unsprung vertical accelerations ddz1fl and dds1fr detected by the unsprung vertical acceleration sensors 38FL and 38FR.

Thus, according to the fifth embodiment, unsprung velocities dz1sfl, dz1sfr and unsprung displacements z1sfl, z1sfr are acquired using the observer based on unsprung vertical accelerations ddz1fl and ddz1fr detected by the unsprung vertical acceleration sensors 38FL and 38FR. Further, since the damping control is executed in the same manner as in the fourth embodiment except for the acquisition of unsprung velocities and unsprung displacements, as in the fourth embodiment, the same effects as those of the first embodiment can be obtained for both the front wheels and the rear wheels.

Notably, unsprung velocities and unsprung displacements may be acquired using an observer based on vertical accelerations ddz2 of the sprung detected by the sprung vertical acceleration sensors or strokes H which are relative displacements between the sprung and the unsprung detected by the stroke sensors. Each unsprung velocity and unsprung displacement may be obtained using an observer based on any two or three of unsprung vertical acceleration ddz2, stroke H and unsprung vertical acceleration ddz1. Further, the observer may be any observer known in the art and may be stored in the ROM of the ECU 30.

(Transmission of Unsprung Displacement to Cloud 40)

As described above, in the second to fifth embodiments, unsprung displacements z1s at the positions of the front wheels are acquired based on vertical motion state quantities of the vehicle 10 such as sprung accelerations ddz2, and are stored in the storage device 30a in association with the information on the positions of the front wheels. Therefore, the damping control apparatus 20 may be configured to store a preset number of unsprung displacements z1s and, when the preset transmission condition is satisfied, transmit the unsprung displacement z1s and the position information to the cloud 40 via the wireless communication device 34 and the network.

The management server 42 of the cloud 40 may be configured to store unsprung displacement z1s and position information transmitted from the vehicle 10 and other vehicles as the unsprung displacements z1cn and position (Xn, Yn) information (n=1, 2 ... N (N is a positive integer)) in the cloud for each vehicle. Further, the management server 42 may be configured to update the unsprung displacements z1c to the latest information for each position (Xn, Yn) when a preset transmission condition is satisfied.

The latest unsprung displacements z1c stored in the storage device 44n in the cloud 40 is unsprung displacements acquired based on vertical motion state quantities such as sprung vertical acceleration when the vehicle 10 and other vehicles actually travel. Therefore, the unsprung displacements z1c in the cloud 40 are more accurate than unsprung displacements based on values representing vertical displacements of a road surface in front of the vehicle acquired by the preview sensor 35.

In the second to fifth embodiments, sensors for detecting vertical motion state quantities of the vehicle 10 such as the sprung vertical acceleration sensors 36FL, 36FR are only provided for the left and right front wheels. However, sensors for detecting motion state quantities may also be provided for the left and right rear wheels, and unsprung displacements z1s acquired for the positions of the left and right rear wheels and information on the positions may also be transmitted to the cloud 40.

Further, in the first embodiment, no sensor for detecting a vertical motion state quantity of the vehicle 10 such as the sprung vertical acceleration sensors 36FL, 36FR is provided. However, also in the first embodiment, sensors for detecting motion state quantities may be provided, and unsprung displacements z1s acquired for the positions of the left and right front wheels and/or the rear wheels and the information on positions may be transmitted to the cloud 40.

Sixth Embodiment

In the sixth embodiment, although not shown in the figures, similarly to the third embodiment shown in FIG. 11, the on-board device 21 includes the preview sensor 31 and the unsprung vertical acceleration sensors 38FL, 38FR. In the sixth embodiment, the external device 22 is unnecessary.

Figure 19:
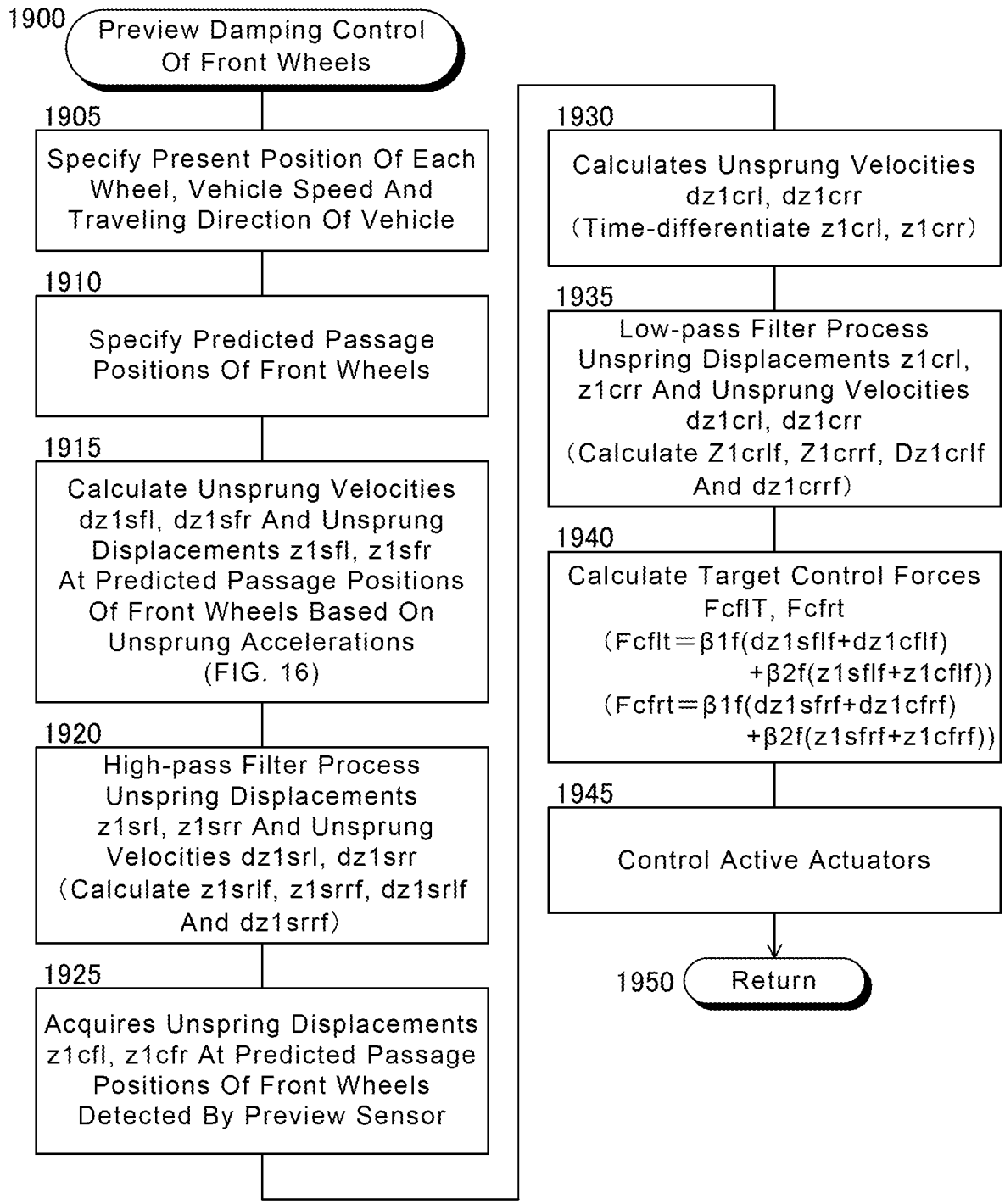
FIG. 19 is a flowchart showing a damping control routine for front wheels in the sixth embodiment.
Figure 20:
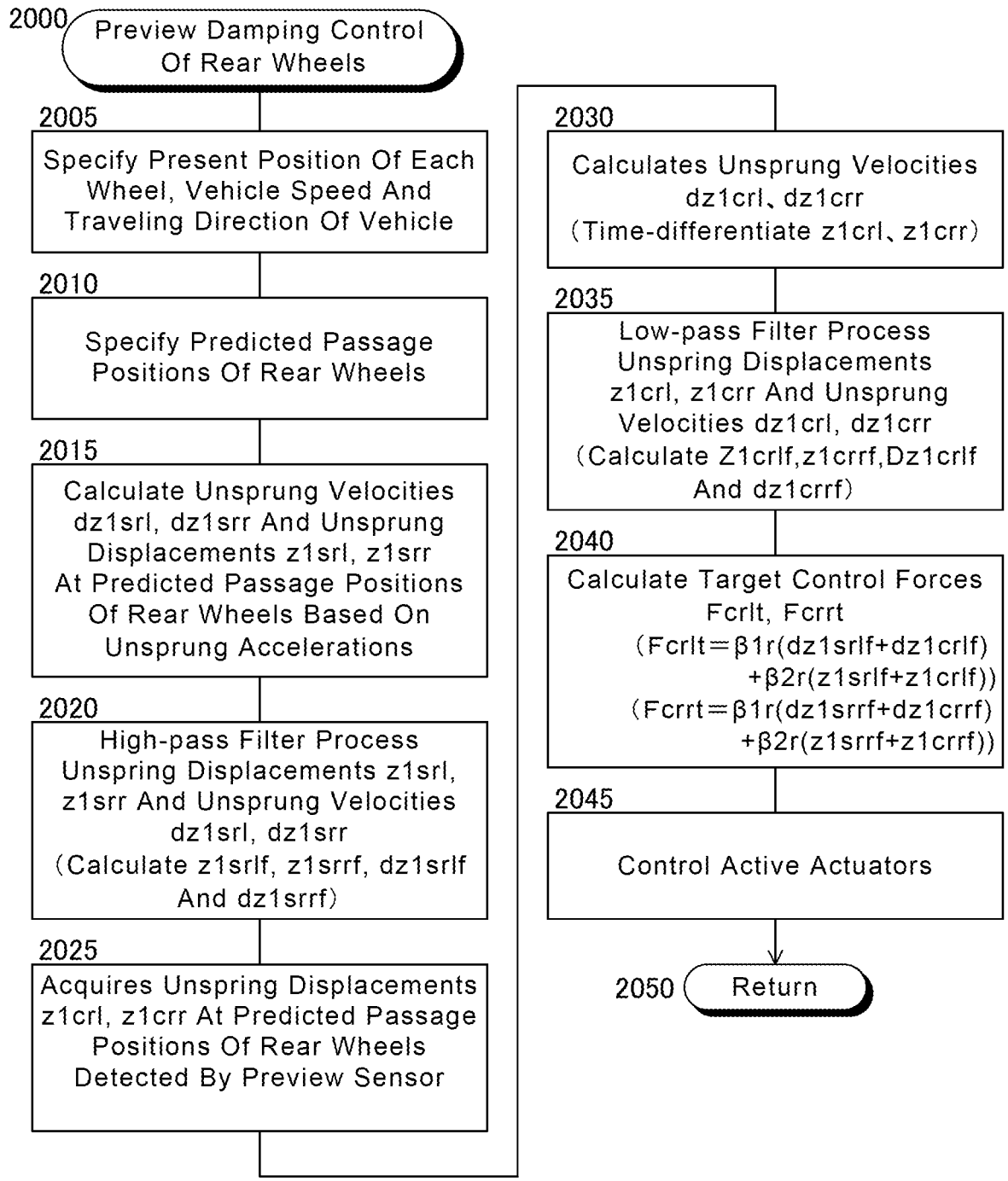
FIG. 20 is a flowchart showing a damping control routine for rear wheels in the sixth embodiment.

The damping control corresponding to the left and right front wheels 11FL and 11FR and the left and right rear wheels 11RL and 11RR is executed by the ECU 30 at predetermined time intervals according to the damping control routines shown in the flowcharts of FIGS. 19 and 20, respectively.

(Preview Damping Control Routine for Front Wheels)

The CPU of the ECU 30 starts processing from step 1900 in FIG. 19 to execute steps 1905 to 1945, and then proceeds to step 1950 to temporarily end this routine.

As can be seen from the comparison between FIGS. 19 and 15, the CPU executes steps 1905 to 1920 in the same manner as in steps 1505 to 1520 of the fourth embodiment, and executes steps 1930 to 1945 in the same manner as in steps 1530 to 1545. Therefore, detailed description of steps 1905 to 1920 and steps 1930 to 1945 will be omitted.

In step 1925, similarly to step 715 of the first embodiment, the CPU acquires unsprung displacements z1cfl and z1cfr at predicted passage positions of the left and right front wheels based on road surface displacements in front of the vehicle detected by the preview sensor 31. In this connection, road surface displacements z0sfl and z0sfr at predicted passage positions of the front wheels detected by the preview sensor 31 and temporarily stored in the RAM may be acquired as unsprung displacements z1cfl and z1cfr, respectively. Further, road surface displacements in front of the vehicle detected by the preview sensor 31 may temporarily be stored in the RAM, and road surface displacements z0sfl and z0sfr at the predicted passage positions of the front wheels may be specified based on the stored road surface displacements, and the specified road surface displacements may be acquired as unsprung displacements z1cfl and z1cfr, respectively.

(Preview Damping Control Routine for Rear Wheels)

The CPU of the ECU 30 starts processing from step 2000 in FIG. 20 to execute steps 2005 to 2045, and then proceeds to step 2050 to temporarily end this routine.

As can be seen from the comparison between FIGS. 20 and 17, the CPU executes steps 2005 to 2020 as in steps 1705 to 1720 in the fourth embodiment, and executes steps 2030 to 2045 as in steps 1730 to 1745 in the fourth embodiment. Therefore, detailed description of steps 2005 to 2020 and steps 2030 to 2045 will be omitted.

In step 2025, the CPU acquires unsprung displacements z1crl and z1crr at predicted passage positions of the left and right rear wheels, respectively, based on road surface displacements z0sfl and z0sfr acquired in step 1925 and stored in the RAM.

As can be seen from the above, in the sixth embodiment, as in the fourth embodiment, unsprung velocities dz1sfl and dz1sfr and unsprung displacements z1sfl and z1sfr are acquired based on unsprung vertical accelerations ddz1fl and ddz1fr detected by the unsprung vertical acceleration sensors 38FL and 38FR. Further, unsprung displacements z1ci and unsprung velocities dz1ci are acquired based on road surface displacements in front of the vehicle detected by the preview sensor 31.

Both the preview sensor and the unsprung vertical acceleration sensors are on-board sensors, but unsprung displacements z1ci and unsprung velocities dz1ci have a higher possibility that a position where the damping control is performed misaligns with a predicted wheel passage position as compared with unsprung displacements z1si and unsprung velocities dz1si. Therefore, also in the sixth embodiment, unsprung displacements z1si and unsprung velocities dz1si as the first road surface displacement-related values are high-pass filtered, and unsprung displacements z1ci and unsprung velocities dz1ci as the second road surface displacement-related values are low-pass filtered. Thus, according to the sixth embodiment, the same effects as those of the first embodiment can be obtained for both the front wheels and the rear wheels.

Seventh Embodiment

In the seventh embodiment, although not shown in the figures, as in the second embodiment shown in FIG. 8, the on-board device 21 includes the preview sensor 31, the sprung vertical acceleration sensors 36FL, 36FR and stroke sensors 37FL, 37FR. Also in the seventh embodiment, the external device 22 is unnecessary.

(Preview Damping Control Routine for Front Wheels)

Figure 21:
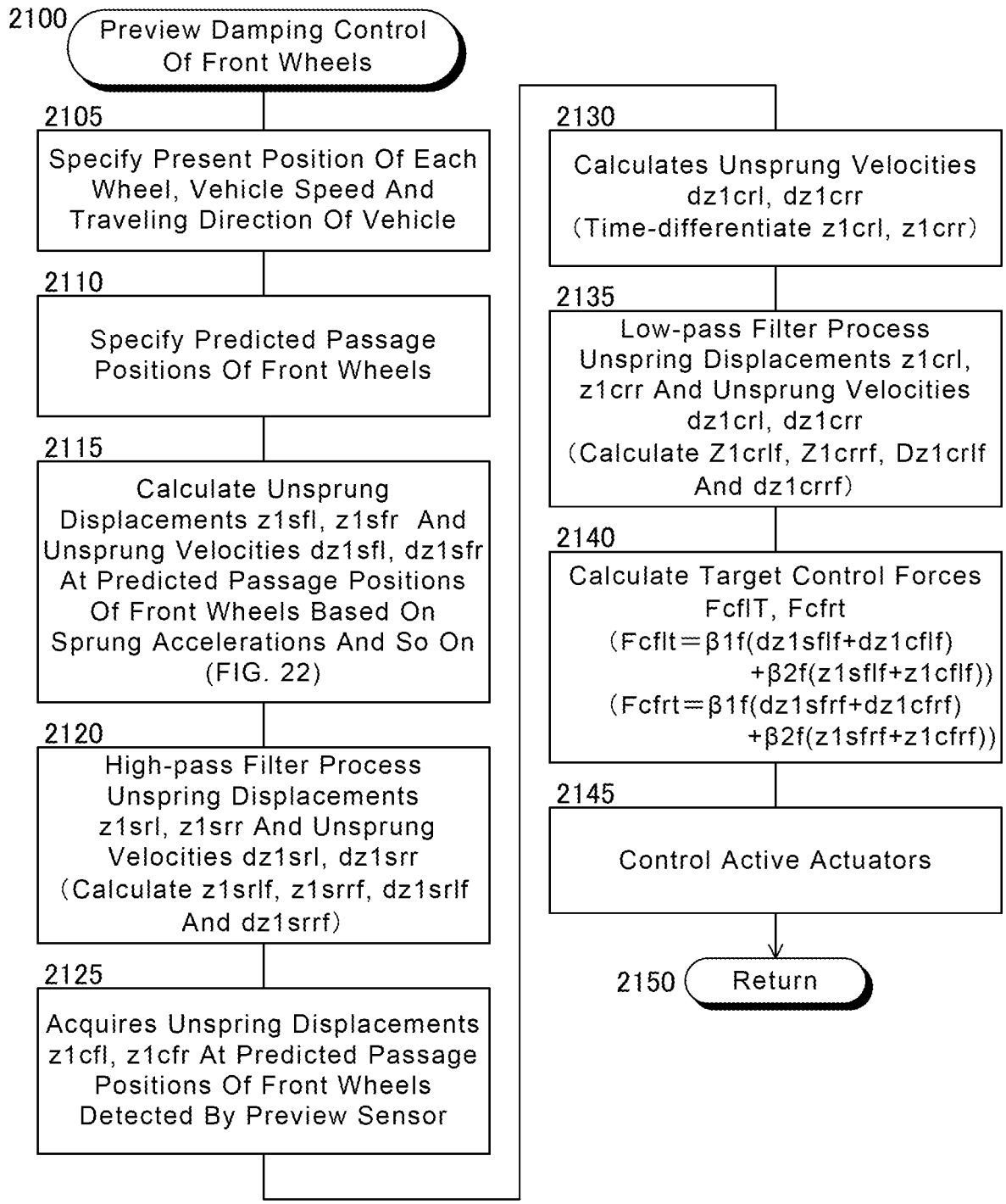
FIG. 21 is a flowchart showing a damping control routine for front wheels in the seventh embodiment.

The damping control corresponding to the left and right front wheels 11FL and 11FR is executed by the ECU 30 at predetermined time intervals according to the damping control routine shown in the flowchart of FIG. 21. The CPU of the ECU 30 starts processing from step 2100 in FIG. 21 to execute steps 2105 to 2145, and then proceeds to step 2150 to temporarily end this routine.

As can be seen from the comparison between FIGS. 21 and 19, the CPU executes steps 2105 and 2110 as in steps 1905 and 1910 in the sixth embodiment, and executes steps 2120 to 2145 as in steps 1920 to 1945 in the sixth embodiment. Therefore, detailed description of steps 2105 and 2110 and steps 2120 to 2145 will be omitted.

Figure 22:
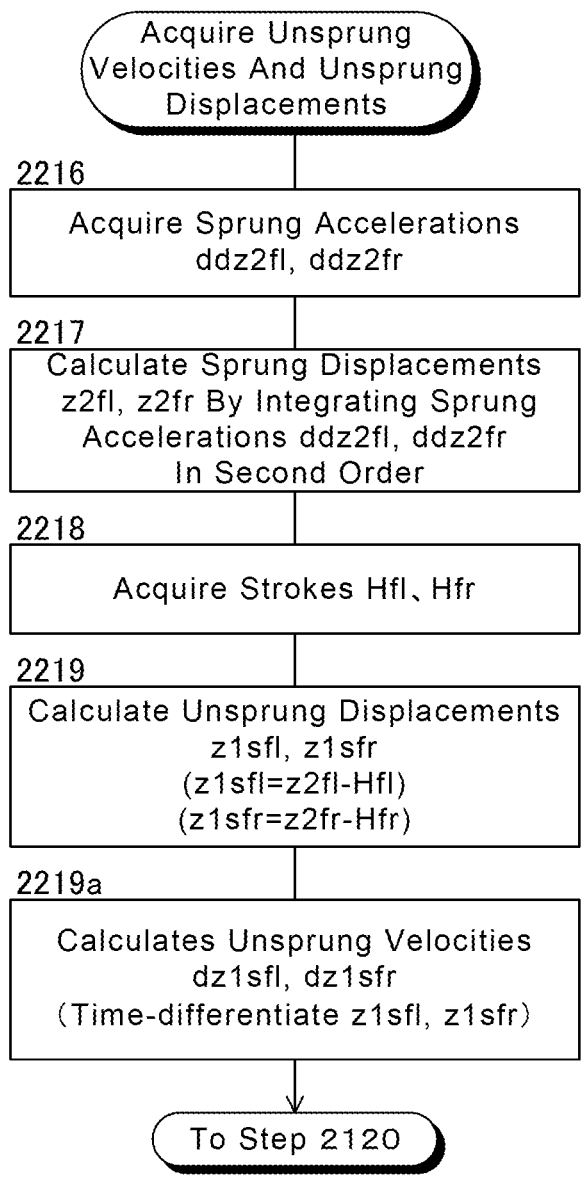
FIG. 22 is a flowchart showing a subroutine executed in step 2115 shown in FIG. 21.

In step 2115, the CPU acquires unsprung velocities dz1sfl and dz1sfr and unsprung displacements z1sfl and z1sfr at the front wheel positions based on sprung vertical accelerations of the front wheels and the like by calculation according to the flowchart of FIG. 22.

As can be seen from the comparison between FIGS. 22 and 10, the CPU executes steps 2216 to 2219 in the same manner as in steps 1005 to 1020 in the second embodiment, respectively. Further, the CPU executes step 2219a in the same manner as in step 920 in the second embodiment.

Although not shown, the preview damping control routine for the rear wheels is executed in the same manner as the preview damping control routine for the rear wheels (FIG. 20) in the sixth embodiment. However, in the step corresponding to step 2015, unsprung velocities dz1srl, dz1srr and unsprung displacements z1srl, z1srr at predicted passage positions of the rear wheels are acquired based on unsprung velocities dz1sfl, dz1sfr and unsprung displacements z1sfl and z1sfr at the front wheel positions acquired in step 2115 and stored in the RAM.

As can be understood from the above, in the seventh embodiment, as in the second embodiment, unsprung displacements z1si and unsprung velocities dz1si are acquired based on sprung accelerations ddz2fl and ddz2fr detected by the sprung vertical acceleration sensors 36FL, 36FR and the like. Further, unsprung displacements z1ci and unsprung velocities dz1ci are acquired based on road surface displacements in front of the vehicle detected by the preview sensor 31.

The preview sensor, the sprung vertical acceleration sensors and the stroke sensors are all on-board sensors, but unsprung displacements z1ci and unsprung velocities dz1ci have a higher possibility that a position where the damping control is performed misaligns with a predicted wheel passage position as compared with unsprung displacements z1si and unsprung velocities dz1si. Therefore, also in the seventh embodiment, unsprung displacements z1si and unsprung velocities dz1si as the first road surface displacement-related values are high-pass filtered, and unsprung displacements z1ci and unsprung velocities dz1ci as the second road surface displacement-related values are low-pass filtered. Thus, according to the seventh embodiment, the same effects as those of the first embodiment can be obtained for both the front wheels and the rear wheels.

Eighth Embodiment

In the eighth embodiment, although not shown in the figures, as in the third embodiment shown in FIG. 11, the on-board device 21 includes the preview sensor 31 and the unsprung vertical acceleration sensors 38FL, 38FR. Also in the eighth embodiment, the external device 22 is unnecessary.

(Preview Damping Control Routine for Front Wheels)

Figure 23:
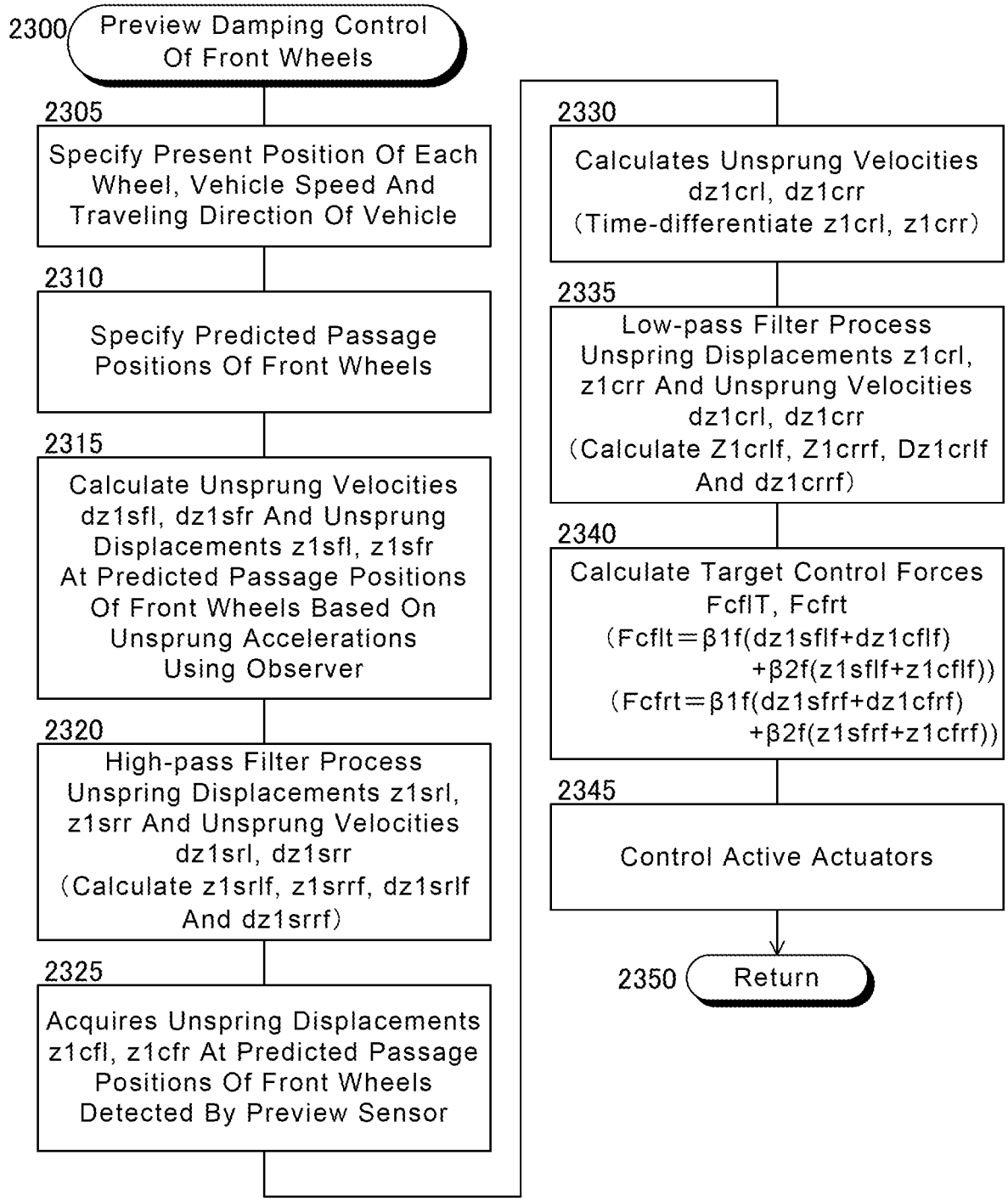
FIG. 23 is a flowchart showing a damping control routine for front wheels in the eighth embodiment.

The damping control corresponding to the left and right front wheels 11FL and 11FR is executed by the ECU 30 at predetermined time intervals according to the damping control routine shown in the flowchart of FIG. 23. The CPU of the ECU 30 starts processing from step 2300 in FIG. 23 to execute steps 2305 to 2345, and then proceeds to step 2350 to temporarily end this routine.

As can be seen from the comparison between FIGS. 23 and 20, the CPU executes steps 2305 to 2320 in the same manner as steps 1805 to 1820 in the fifth embodiment. Further, the CPU executes steps 2325 to 2345 in the same manner as steps 1925 to 1945 in the sixth embodiment. Therefore, detailed description of steps 2305 to 2345 will be omitted.

Although not shown, the preview damping control routine for the rear wheels is executed in the same manner as the preview damping control routine for the rear wheels (FIG. 20) in the sixth embodiment. However, in the step corresponding to step 2015, unsprung velocities dz1srl, dz1srr and unsprung displacements z1srl, z1srr at predicted passage positions of the rear wheels are acquired based on unsprung velocities dz1sfl, dz1sfr and unsprung displacements z1sfl and z1sfr at the front wheel positions acquired in step 2315 and stored in the RAM.

As can be seen from the above, in the eighth embodiment, unsprung velocities dz1sfl, dz1sfr and unsprung displacements z1sfl, z1sfr are acquired using the observer based on unsprung vertical accelerations ddz1fl and ddz1fr detected by the unsprung vertical acceleration sensors 38FL and 38FR. Further, since the damping control is executed in the same manner as in the sixth embodiment except for the acquisition of unsprung velocities and unsprung displacements, as in the sixth embodiment, the same effects as those of the first embodiment can be obtained for both the front wheels and the rear wheels.

(Effects Common to Embodiments)

As can be seen from the above description, according to the first to eighth embodiments described above, the high-pass filter processing and the low-pass filter processing function as complementary filter processing, so that a target control force can be calculated with an error caused by the misalignment of positions and an error caused by detection errors being reduced. Therefore, it is possible to damp the sprung more accurately than in the past.

In particular, in the second to fourth embodiments, as the damping control on the sprung at the rear wheels, the damping control on the sprung at the rear wheels is performed using the unsprung displacement-related values at the front wheel position acquired by the on-board sensors. Therefore, since it is not necessary to filter the second unsprung displacement-related value online, the controllability of damping in the extremely low frequency region can be prevented from being lowered due to the filtering. Further, in the sixth to eighth embodiments, since no unsprung displacement-related value is acquired from the preview reference data 45 of the cloud 40, it is not necessary to filter any unsprung displacement-related value, and the controllability of damping in an extremely low frequency region can be prevented from being lowered due to the filtering.

According to the first embodiment, the sprung can be damped more accurately than in the past without the need for a sensor that detects a vertical motion state quantity of the vehicle 10 such as the vertical acceleration sensors 36FL, 36FR on the sprung.

Further, unsprung displacements z1s acquired based on a detection results of sensors that detect motion state quantities of the vehicle 10 in the vertical direction such as the sprung vertical acceleration sensors 36FL, 36FR are more accurate than unsprung displacements z1s acquired based on the detection result of the preview sensor 35. Therefore, according to the second and third embodiments described above, it is possible to damp the sprung with higher accuracy than in the first embodiment.

Modification Example

In the first to eighth embodiments described above, unsprung velocities dz1si are high-pass filtered, unsprung velocities dz1ci are low-pass filtered, and then the unsprung velocities after high-pass filtering and the unsprung velocities after low-pass filtering are sumed. However, unsprung displacements z1si may be high-pass filtered, unsprung displacements z1ci may be low-pass filtered, they may be time-differentiated, and their time-differentiated values may be sumed. Further, the unsprung displacements z1si may be high-pass filtered, the unsprung displacements z1ci may be low-pass filtered, they are sumed, and the sumed values may be time-differentiated.

In the first to eighth embodiments described above, the preview damping control of the front wheel position may be omitted, or in the first to eighth embodiments, the preview damping control of the rear wheel position may be omitted. In the fourth embodiment, the unsprung vertical acceleration sensors 38FL and 38FR provided on the front wheels may be omitted, and similar unsprung vertical acceleration sensors may be provided on the rear wheels, and the same damping control as the damping control of the front wheel position in the fourth embodiment may be performed at the rear wheel position. Further, in the fourth embodiment, the vertical acceleration sensors on the unsprungs may be replaced with vertical acceleration sensors and stroke sensors on the sprung, and further, the vertical acceleration sensors and the stroke sensors on the sprung may be provided only corresponding to the rear wheels. Therefore, damping control of the rear wheel position may be performed based on these detection results of these sensors.

Although the present disclosure has been described in detail with reference to specific embodiments, it will be apparent to those skilled in the art that the present disclosure is not limited to the above-described embodiments, and various other embodiments are possible within the scope of the present disclosure.

For example, in the above-described embodiments, the road surface displacement-related information is unsprung displacements that represent vertical displacements of the unsprungs of the vehicle, but may be at least one of unsprung displacements, unsprung velocities which are time derivative values of unsprung displacements, road surface displacements which represent vertical displacements of a road surface, and road surface displacement velocities which are time derivative values of the road surface displacements.

Further, in the above-described embodiments, the road surface displacement-related value is displacements of the unsprungs representing vertical displacements of the unsprungs of the vehicle, but may be road surface displacements representing vertical displacements of a road surface.

Further, in the above-described embodiments, the preview reference data 45 does not have to be stored in the storage device 44 of the cloud 40, and may be stored in the storage device 30a. In the second and third embodiments, the CPU may store acquired data in the storage device 30a as it is, and does not need to transmit the acquired data to the cloud 40.

Further, when a travel route of the vehicle 10 is predetermined, the CPU may download the preview reference data 45 of the travel route from the cloud 40 in advance before the vehicle 10 starts traveling on the travel route, and may store the preview reference data in the storage device 30a.

In the preview reference data 45, unsprung velocities dz1ci may be stored in association with the position information and vehicle speed information instead of unsprung displacements z1. In that case, in step 750 shown in FIG. 7, for example, the CPU acquires unsprung velocities dz1ci and calculates unsprung displacements z1ci by integrating the acquired unsprung velocities dz1ci.

The vertical acceleration sensors 38 may be provided corresponding to at least three wheels. Sprung acceleration corresponding to the wheel that is not provided with a vertical acceleration sensor 38 can be estimated based on the sprung accelerations detected by the three vertical acceleration sensors 38.

The calculation process of a target control force Fct of the rear wheel 11R in the first embodiment is not limited to the above example. For example, the CPU may calculate a target control force Fct based on a unsprung displacement z1 of the present position of the front wheel 11F at the present time tp, and may transmit a control command including the target control force Fct to the rear wheel active actuator 17R at a timing delayed by a time (L/V−tpr) from the present time tp. That is, the CPU may transmit a control command including the target control force Fcrt to the rear wheel active actuator 17R at a timing when the rear wheel 11R reaches a point ahead of the present position of the front wheel 11F by the rear wheel foresee distance Lpr.

Further, the CPU may identify a predicted movement course of the rear wheel 11R based on the present position of the rear wheel, the traveling direction Td of the vehicle 10 and the positional relationship data independently of a predicted movement course of the front wheel, and may specify a position spaced by the rear wheel foresee distance Lpr along the predicted rear wheel movement course as a predicted passage position of the rear wheel. Then, the CPU may acquire an unsprung displacement z1 at the predicted passage position of the rear wheel, and may calculate a target control force Fct of the rear wheel 11R based on the acquired unsprung displacement z1.

The suspensions 13FL to 13RR may be any type of suspension as long as the wheels 11FL to 11RR and the vehicle body 10a are allowed to be displaced vertically with respect to each other. Further, the suspension springs 16FL to 16RR may be arbitrary springs such as compression coil springs and air springs.

In the above-described embodiments, the active actuators 17FL to 17RR are provided corresponding to the wheels 11, but at least one wheel 11 may be provided with an active actuator 17. For example, the vehicle 10 may include only one each of the front wheel active actuator 17F and the rear wheel active actuator 17R.

In the above-described embodiments and the above-described modified example, the active actuator 17 is used as the control force generating device, but the control force generating device is not limited to the active actuator. That is, the control force generating device may be any actuator capable of adjustably generating a vertical control force for damping the sprung 51 based on a control command including a target control force.

Further, the control force generating devices may be active stabilizer devices (not shown), that includes a front wheel active stabilizer device and a rear wheel active stabilizer device. The front wheel active stabilizer device is configured to generate a vertical control force (i.e., a front left wheel control force) in one of directions between the sprung 51 corresponding to the front left wheel 11FL and the unsprung 50 corresponding to the front left wheel 11FL and to generate a vertical control force (i.e., a front right wheel control force) in the other one of directions between the sprung 51 corresponding to the front right wheel 11FR and the unsprung 50 corresponding to the front right wheel 11FR. The rear wheel active stabilizer device is configured to generate a vertical control force (i.e., a rear left wheel control force) in one of directions between the sprung 51 corresponding to the rear left wheel 11RL and the unsprung 50 corresponding to the rear left wheel 11RL and to generate a vertical control force (i.e., a rear right wheel control force) in the other one of directions between the sprung 51 corresponding to the rear right wheel 11RR and the unsprung 50 corresponding to the rear right wheel 11RR. The thus configured active stabilizer device is well-known, and is disclosed in, for example, Japanese Patent Application Laid-Open No. 2009-96366 that is hereby incorporated by reference. It should be noted that the active stabilizer device may include only either the front wheel active stabilizer device or the rear wheel active stabilizer device.

The control force generating device may be a device configured to generate a vertical control force by increasing and decreasing a braking force or a driving force applied to the wheel 11 of the vehicle 10 with utilizing geometry of the suspension 13. This type of control force generating device is well-known, and is disclosed in, for example, Japanese Patent Application Laid-Open No. 2016-107778 that is hereby incorporated by reference. When this device is employed, the ECU 30 calculates a braking force or a driving force to generate a control force corresponding to a target control force that corresponds to a target actuator force.

In addition, this type of device may include a drive device (e.g., an in-wheel motor) for applying a driving force to the wheel 11 and a brake device for applying a braking force to the wheel 11. In this case, the drive device may be a motor and/or an engine that can apply driving forces to either one of or both of the front wheels and the rear wheels. Furthermore, the control force generating device may include at least one of the drive device and the brake device.

The shock absorbers 15FL to 15RR may be replaced with the variable damping force shock absorbers so as to be the control force generating devices. In this case, the ECU 30 controls damping coefficients of the shock absorbers in such a manner that damping forces of the shock absorbers varies depending on corresponding target control forces.

What is claimed is:

1. A damping control apparatus for a vehicle which comprises:
    a control force generating device configured to generate a vertical control force for damping a sprung of the vehicle between at least one wheel and a vehicle body portion corresponding to a position of the wheel;
    an electronic control unit configured to control the control force generating device; and
    a road surface displacement-related information acquisition device configured to acquire road surface displacement-related information related to a vertical displacement of a road surface, wherein
    the electronic control unit is configured to:
    determine a predicted wheel passage position where a wheel is predicted to pass,
    perform a high-pass filter processing on a first road surface displacement-related value,
    perform a low-pass filter processing on a second road surface displacement-related value,
    calculate a target control force for reducing a vibration of the sprung when the wheel passes through the predicted wheel passage position based on a sum of the first road surface displacement-related value after the high-pass filter processing and the second road surface displacement-related value after the low-pass filter processing, and
    control the control force generating device so that a control force generated by the control force generating device when the wheel passes through the predicted wheel passage position becomes the target control force,
    the first and second road surface displacement-related values are two different road surface displacement-related values among a road surface displacement-related value acquired based on road surface displacement-related information stored in a storage device that stores road surface displacement-related information acquired based on a vertical motion state quantity of the vehicle or other vehicles when the vehicle or the other vehicles travels in association with the information of a position where the vertical motion state quantity is detected, a road surface displacement-related value calculated by a calculation unit based on the vertical motion state quantity of the vehicle, and a road surface displacement-related value acquired by a preview sensor that acquires a road surface displacement-related value in front of the vehicle,
    the second road surface displacement-related value has a higher possibility that a position where a control force corresponding to the target control force is generated misaligns with the predicted wheel passage position as compared with the first road surface displacement-related value, and
    the road surface displacement-related information acquisition device includes at least two devices for acquiring the first and second road surface displacement-related values among the storage device, the calculation unit, and the preview sensor.

2. The damping control apparatus for a vehicle according to claim wherein
    the road surface displacement-related information acquisition device includes the preview sensor and the storage device, and
    the first road surface displacement-related value is a road surface displacement-related value acquired by the preview sensor, and the second road surface displacement-related value is a road surface displacement acquired based on the road surface displacement-related information stored in the storage device.

3. The damping control apparatus for a vehicle according to claim wherein
    the road surface displacement-related information acquisition device includes a sprung vertical acceleration sensor that detects a vertical acceleration of the sprung at a position of the wheel and a stroke sensor that detects a relative displacement between the sprung and an unsprung at the position of the wheel, and the storage device, and
    the first road surface displacement-related value is a road surface displacement-related value calculated based on a vertical acceleration of the sprung and a relative displacement between the sprung and the unsprung, and the second road surface displacement-related value is a road surface displacement-related value acquired based on the road surface displacement-related information stored in the storage device.

4. The damping control apparatus for a vehicle according to claim 1, wherein
    the road surface displacement-related information acquisition device includes an unsprung vertical acceleration sensor that detects a vertical acceleration of an unsprung at a position of the wheel, and the storage device, and
    the first road surface displacement-related value is a road surface displacement-related value calculated based on a vertical acceleration of the unsprung, and the second road surface displacement-related value is a road surface displacement-related value acquired based on the road surface displacement-related information stored in the storage device.

5. The damping control apparatus for a vehicle according to claim 1, wherein
the road surface displacement-related information acquisition device includes at least one of a sprung vertical acceleration sensor that detects a vertical acceleration of the sprung at a position of the wheel, and a stroke sensor that detects a relative displacement between the sprung and an unsprung at the position of the wheel, an unsprung vertical acceleration sensor that detects a vertical acceleration of an usprung at the position of the wheel, and the storage device, and
the first road surface displacement-related value is a road surface displacement-related value acquired by using an observer based on a motion state quantity detected by at least one of the sensors, and the second road surface displacement-related value is a road surface displacement-related value acquired based on the road surface displacement-related information stored in the storage device.

6. The damping control apparatus for a vehicle according to claim wherein
the road surface displacement-related information acquisition device includes a sprung vertical acceleration sensor that detects a vertical acceleration of the sprung at a position of the wheel and a stroke sensor that detects a relative displacement between the sprung and an unsprung at the position of the wheel, and the preview sensor, and
the first road surface displacement-related value is a road surface displacement-related value calculated based on a vertical acceleration of the sprung and a relative displacement between the sprung and the unsprung, and the second road surface displacement-related value is a road surface displacement-related value acquired by the preview sensor.

7. The da ping control apparatus for a vehicle according to claim wherein
the road surface displacement-related information acquisition device includes an unsprung vertical acceleration sensor that detects a vertical acceleration of an unsprung at a position of the wheel, and the preview sensor, and
the first road surface displacement-related value is a road surface displacement-related value calculated based on a vertical acceleration of the unsprung, and the second road surface displacement-related value is a road surface displacement-related value acquired by the preview sensor.

8. The damping control apparatus for a vehicle according to claim 1, wherein
the road surface displacement-related information acquisition device includes at least one of a sprung vertical acceleration sensor that detects a vertical acceleration of the sprung at a position of the wheel, and a stroke sensor that detects a relative displacement between the sprung and an unsprung at the position of the wheel, and an unsprung vertical acceleration sensor that detects an unsprung vertical acceleration at the position of the wheel, and the preview sensor, and
the first road surface displacement-related value is a road surface displacement-related value acquired by using an observer based on a motion state quantity detected by at least one of the sensors, and the second road surface displacement-related value is a road surface displacement-related value acquired by the preview sensor.

9. The damping control apparatus for a vehicle according to claim 1, wherein the storage device is a storage device outside the vehicle, and the electronic control unit is configured to acquire road surface displacement-related information at the predicted wheel passage position from the storage device via a wireless communication line.

10. The damping control apparatus for a vehicle according to claim 1, wherein a cutoff frequency of the high-pass filter processing and a cutoff frequency of the low-pass filter processing are the same.

11. The damping control apparatus for a vehicle according to claim 10, wherein the cutoff frequency is a frequency between a resonance frequency of the sprung and a resonance frequency of an unsprung corresponding to the wheel.

12. A damping control method for a vehicle which damps a sprung of the vehicle by controlling a control force generating device configured to generate a vertical control force for damping the sprung of the vehicle between at least one wheel and a vehicle body portion corresponding to a position of the wheel, wherein
the method comprises:
a step of determining a predicted wheel passage position where the wheel is predicted to pass,
a step of acquiring a first road surface displacement-related value at the predicted wheel passage position and performing a high-pass filter processing on the first road surface displacement-related value,
a step of acquiring a second road surface displacement-related value at the predicted wheel passage position and performing a low-pass filter processing on the second road surface displacement-related value,
a step of calculating a target control force for reducing a vibration of the sprung when the wheel passes through the predicted wheel passage position based on a sum of the first road surface displacement-related value after high-pass filter processing and the second road surface displacement-related value after low-pass filter processing, and
a step of controlling the control force generating device so that a control force generated by the control force generating device when the wheel passes through the predicted wheel passage position becomes the target control force,
the first and second road surface displacement-related values are two different road surface displacement-related values among a road surface displacement-related value acquired based on road surface displacement-related information stored in a storage device that stores road surface displacement-related information acquired based on a vertical motion state quantity of the vehicle or other vehicles when the vehicle or the other vehicles travels in association with the information of a position where the vertical motion state quantity is detected, a road surface displacement-related value calculated based on the vertical motion state quantity of the vehicle, and a road surface displacement-related value acquired by a preview sensor that acquires a road surface displacement-related value in front of the vehicle, and
the second road surface displacement-related value has a higher possibility that a position where a control force corresponding to the target control force is generated misaligns with the predicted wheel passage position as compared with the first road surface displacement-related value.

* * * * *